United States Patent
Maruyama et al.

(10) Patent No.: US 7,290,108 B2
(45) Date of Patent: Oct. 30, 2007

(54) INFORMATION PROCESSING SYSTEM HAVING VOLUME GUARD FUNCTION

(75) Inventors: Tetsuya Maruyama, Yokohama (JP); Shunji Kawamura, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 11/179,506

(22) Filed: Jul. 13, 2005

(65) Prior Publication Data

US 2006/0218256 A1 Sep. 28, 2006

(30) Foreign Application Priority Data

Mar. 25, 2005 (JP) ............................. 2005-087543

(51) Int. Cl.
*G06F 12/14* (2006.01)
(52) U.S. Cl. .................. 711/163; 711/152; 711/164
(58) Field of Classification Search ............... None
See application file for complete search history.

(56) References Cited

U.S. PATENT DOCUMENTS

2001/0025346 A1 * 9/2001 Kayashima et al. ........ 713/200
2004/0143832 A1 7/2004 Yamamoto
2005/0021908 A1 * 1/2005 Ohno et al. ................. 711/114

FOREIGN PATENT DOCUMENTS

JP 2000-112822 4/2000
JP 2004-220450 8/2004

* cited by examiner

*Primary Examiner*—T Nguyen
(74) *Attorney, Agent, or Firm*—Mattingly, Stanger, Malur & Brundidge, P.C.

(57) ABSTRACT

In a system comprising a first storage system providing plural first logical volumes including real logical volume and a virtual logical volume with a host, a second storage system having a second logical volume, and a management computer, when the first storage system receives an access request to the virtual logical volume, it accesses a second logical volume associated with the virtual logical volume. In this system, when the management computer receives a request to guard one of the plural first logical volumes, it checks whether a target first logical volume of the request is a real logical volume or a virtual logical volume, in case of the virtual logical volume, generates and provides a possible at least one option to guard the virtual logical volume by considering a program for volume guard, which each of the first storage system and the second storage system has.

20 Claims, 21 Drawing Sheets

FIG. 5

STORAGE TABLE (201)

| STORAGE SYSTEM (501) | ACCESS GUARD CONTROL (502) | VOLUME PROPERTY CONTROL (503) | ENCRYPTION WRITE (505) |
|---|---|---|---|
| STORAGE-01 | ○ | ○ | ○ |
| STORAGE-02 | ○ | × | × |
| STORAGE-03 | ○ | ○ | × |
| STORAGE-04 | × | ○ | × |
| STORAGE-11 | ○ | ○ | × |

FIG. 6

ACCESS GUARD CORRESPONDING TABLE (202)

| STORAGE SYSTEM (601) | LU# (602) | ACCESS GUARD PROPERTY (603) | HOST GROUP (604) |
|---|---|---|---|
| STORAGE-01 | AZB1225-001 | VALID | A-001 |
| STORAGE-01 | AZB1225-002 | INVALID | |
| STORAGE-02 | AZJ3001-001 | INVALID | |

FIG. 7

MAPPING TABLE (203)

| LU# (701) | STORAGE SYSTEM (702) | EXTERNAL LU# (703) | EXTERNAL STORAGE SYSTEM (704) |
|---|---|---|---|
| AZB1225-011 | STORAGE-01 | AZB3001-001 | STORAGE-02 |
| AZB1225-013 | STORAGE-01 | AZB4001-005 | STORAGE-03 |
| AZB1225-001 | STORAGE-01 | — | — |
| AZB1230-015 | STORAGE-01 | AZJ3001-005 | STORAGE-02 |

FIG. 8

VOLUME CORRESPONDING TABLE (204)

| STORAGE SYSTEM (801) | LU# (802) | VOLUME PROPERTY (803) | RETENTION TERM (805) | ENCRYPTION (806) |
|---|---|---|---|---|
| STORAGE-01 | AZB1225-001 | READ ONLY | 115 DAYS | ○ |
| STORAGE-01 | AZB1225-005 | PROTECT | 0 | ○ |
| STORAGE-02 | AZJ43001-010 | — | — | × |
| STORAGE-01 | AZB1225-013 | READ/WRITE | — | ○ |

FIG. 9

| LU# | VOLUME PROPERTY | CACHE MODE PROPERTY | RETENTION TERM |
|---|---|---|---|
| AZB1225-001 | READ ONLY | INVALID | 115 DAYS |
| AZB1225-002 | PROTECT | — | 50 DAYS |
| AZB1225-003 | READ/WRITE | VALID | |
| AZB1225-011 | READ/WRITE | VALID | 100 DAYS |

VOLUME TABLE

FIG. 10

| LU# | ACCESS GUARD PROPERTY | HOST GROUP |
|---|---|---|
| AZB1225-001 | VALID | A-001 |
| AZB1225-002 | INVALID | A-002 |

PORT TABLE

FIG. 11

EXTERNAL VOLUME TABLE 303

| LU# | EXTERNAL CONNECTION PORT | EXTERNAL LU# |
|---|---|---|
| AZB1225-011 | AZB1220 | AZJ3001-001 |
| AZB1225-013 | AZB1225 | AZJ4001-005 |
| AZB1225-015 | AZB1220 | AZJ3001-005 |

FIG. 12

HOST TABLE 304

| HOST PORT | HOST GROUP |
|---|---|
| HTB1001 | A-001 |
| HTC2005 | A-001 |
| HTM1001 | A-002 |
| HTA1002 | A-003 |

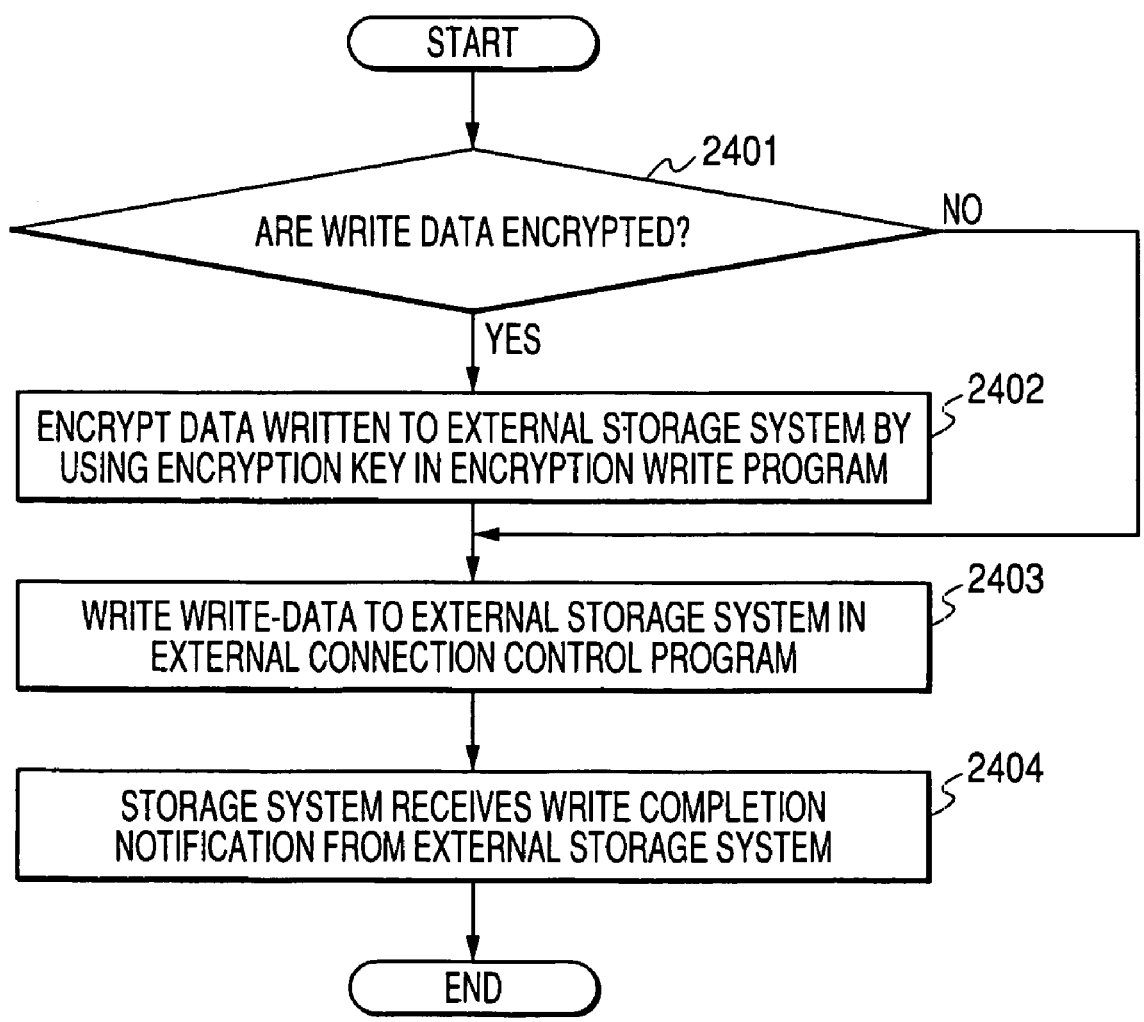

INFORMATION PROCESSING SYSTEM HAVING VOLUME GUARD FUNCTION

CROSS-REFERENCE TO RELATED APPLICATIONS

This application relates to and claims priority from Japanese Patent Application No. 2005-087543, filed on Mar. 25, 2005, the entire disclosure of which is incorporated herein by reference.

BACKGROUND

The present invention relates to a guard technique of volume in an information processing system in which plural storage systems are connected by a network.

In the information processing system including a host computer (hereinafter called a business host) and a storage system, it is important to realize the following two functions so as to guard data written into the storage system.

(1) Access except for the permitted business host is denied.

(2) An erroneous operation of an administrator of the storage system is prevented and it is prohibited that the administrator of the storage system having an evil intention rewrites data.

The above functions are collectively called a volume guard function.

There is an access guard technique as one of techniques for realizing the function of (1). The access guard technique is a technique for determining the accessible business host in advance with respect to each of logical devices (hereinafter called logical volumes) constructed from a physical disk arranged in the storage system, and denying access to its area from a host except for the determined business host.

The storage system holds a port ID of the business host giving access permission with respect to each logical volume as information for managing each logical volume. When the storage system receives an access request with respect to the logical volume, the storage system checks whether the port ID of a required business host conforms to the port ID of the business host giving the access permission. The storage system permits the access only when these port IDs conform to each other.

At this time, plural business hosts are classified into groups, and the permission and denial of the access to each logical volume may be also set every group. Hereinafter, this group is called a host group.

There is a volume property guard technique as one of techniques for realizing the system of (2). Here, in this specification, the volume property is a preset mode of prohibition and permission of the access such as read and write with respect to each logical volume. Concretely, there are Read/Write for permitting both read and write, Read Only for permitting only read, Protect for prohibiting both read and write, etc.

The volume property guard technique is a technique for controlling the access to the logical volume in accordance with the volume property set in advance to each logical volume. Concretely, the above volume property is set in advance with respect to each logical volume. When the access is gotten to the logical volume, a control operation is performed such that the set property is confirmed and the read and/or the write is permitted and denied in accordance with this property (e.g., see JP-A-2000-112822, hereinafter called patent literature 1) In accordance with the method disclosed in patent literature 1, a disk controller connected to the business host and controlling the input and output of data with respect to the logical volume is arranged. Information relating to the property of each logical volume is held in the disk controller. The business host gets access to the storage system through the disk controller.

Here, in the information processing system including the business host and the plural storage systems, there is a technique in which one storage system provides the volume of another storage system connected to this one storage system as the volume of the self storage system as a method for providing the logical volume of the storage system to the business host (e.g., see JP-A-2004-220450, hereafter called patent literature 2). The connection of another storage system made so as to provide the volume of another storage system as the volume of the self storage system is hereinafter called external connection.

The storage system of a connecting source externally connected to another storage system provides a virtual logical volume called a virtual logical volume corresponding to the logical volume within the another storage system to the business host. Hereinafter, the storage system externally connected to the storage system providing the virtual logical volume to the business host is called an external storage system. When an access request is received from the business host to the virtual logical volume, the storage system providing the virtual logical volume to the business host gets access to the logical volume within the external storage system corresponding to this virtual logical volume, and returns its result to the business host.

SUMMARY

In accordance with the system of patent literature 1, it is guaranteed that read and write using the business host not permitted with respect to the logical volume of the storage system are not performed. However, no access guard with respect to the logical volume of the external storage system in the information processing system having the external storage system is disclosed.

In the information processing system having the external storage system, various volume guard systems able to be set are formed in accordance with a function relating to the volume guard arranged in each of the storage system and the external storage system providing the virtual logical volume to the business host, or the construction of the system. Accordingly, a complicated procedure is required in the setting.

Therefore, it is needed to provide a setting technique of high reliability able to easily perform setting for guarding the logical volume of the external storage system by an administrator of the storage system, and raise safety of the entire operation of the information system. The present invention is made in consideration of the above situation.

In one embodiment of the present invention, information relating to the volume guard is collected in a management server for managing each storage system within the information processing system, and the management server generates and presents a selectable volume guard system in accordance with a predetermined method.

Concretely, one embodiment provides an information processing system comprising a first storage system, a second storage system connected to the first storage system, and a management console connected to the first storage system and the second storage system. The first storage system has a real memory area for providing one or more first memory areas arranged in the first storage system itself to a host computer as a logical memory area, and a virtual memory area for providing one or more second memory areas arranged in the second storage system to the host computer as a logical memory area. The management console has a volume guard function holding means and a volume guard managing means. The volume guard function holding means collects and holds information for specifying a function (first volume guard function) for guarding data within the logical memory area provided to the host computer by the first storage system from the first storage system. The volume guard function holding means also collects and holds information for specifying a function (second volume guard function) for guarding data within the second memory area arranged in the second storage system from this second storage system. When a command for guarding the data within the second memory area is received from a user, the volume guard managing means generates a system (second memory area guard system) for guarding selectable data within the second memory area by combining the first volume guard function and the second volume guard function with reference to the volume guard function holding means, and presents this system to the user.

In accordance with the one embodiment of the present application, an administrator of the storage system can easily perform setting for guarding the logical volume of the external storage system. Accordingly, reliability of the setting relating to the volume guard including that of the external storage system is raised, and safety of the entire operation of the information system is raised.

BRIEF DESCRIPTION OF THE DRAWINGS

FIG. 5 is one example of a storage table of this embodiment.

FIG. 6 is one example of an access guard corresponding table of this embodiment.

FIG. 7 is one example of a mapping table of this embodiment.

FIG. 8 is one example of a volume corresponding table of this embodiment.

FIG. 9 is one example of a volume table of this embodiment.

FIG. 10 is one example of aport table of this embodiment.

FIG. 11 is one example of an external volume table of this embodiment.

FIG. 12 is one example of a host table of this embodiment.

FIG. 25 is a flow chart showing one example of the operation of the storage system when data are written to the external storage system of this embodiment.

DESCRIPTION OF THE PREFERRED EMBODIMENTS

An embodiment of an information processing system applying the present invention thereto will next be explained by using the drawings. The embodiment described below is one example to practice this invention, and the invention is not limited the embodiment.

Moreover, each program explained below comprises codes, each of which cause a computer, a storage system, or an external storage system to execute a process or a step shown in the embodiment.

Figure 1:
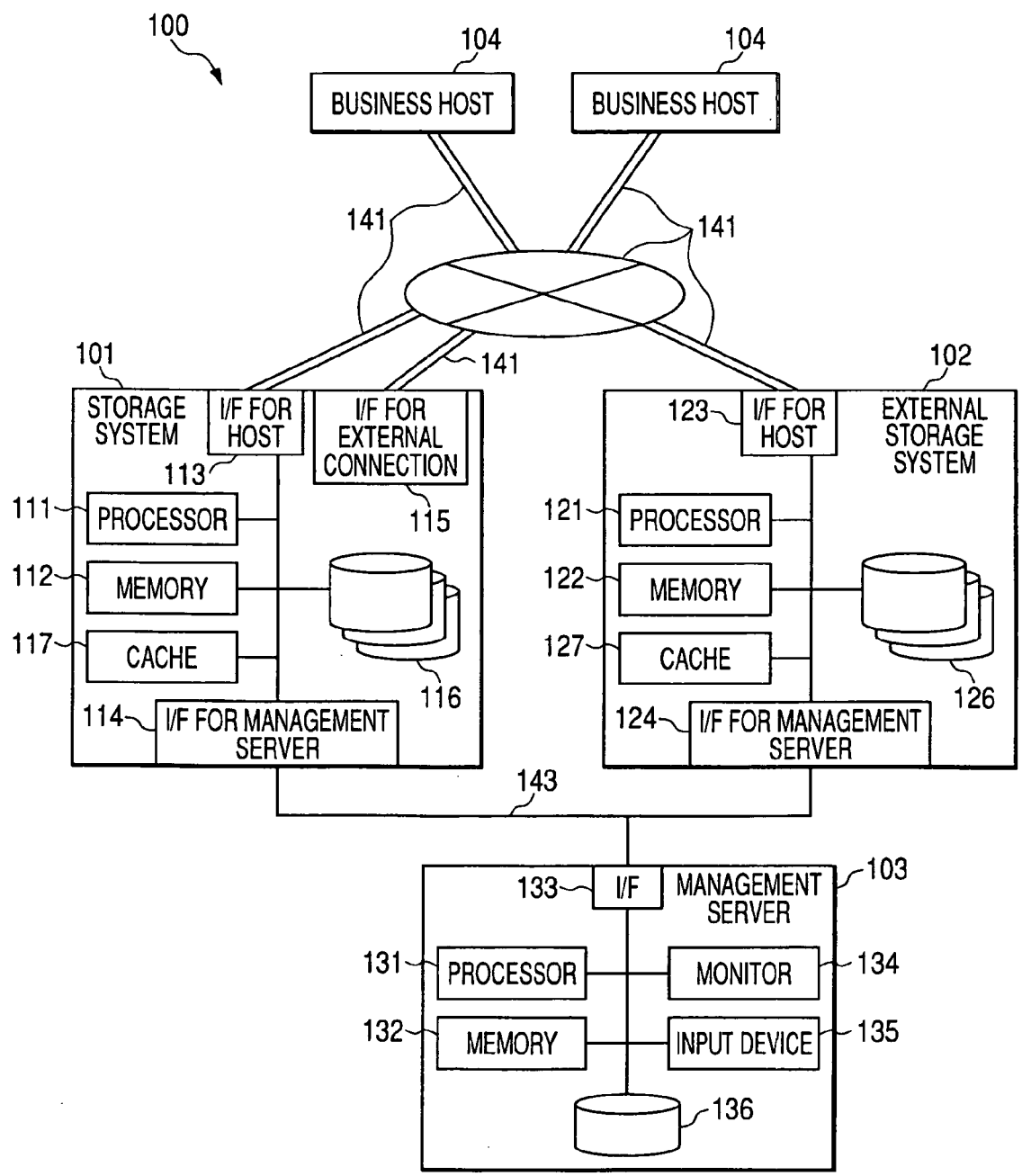
FIG. 1 is a diagram showing an exemplary information processing system of one embodiment of the present invention.

FIG. 1 is a view of the construction of the information processing system 100 of this embodiment mode. As shown in this figure, the information processing system 100 of this embodiment mode has a storage system 101, a storage system 102 (external storage system 102) as an external storage system, and a host computer (hereinafter called a business host) 104, a network 141 for connecting these storage systems and business host, a management server 103 for operating and maintaining and managing the entire information processing system 100, and a network 143 for connecting the management server 103, the storage system 101 and the external storage system 102.

The storage system 101 has a processor 111, a memory 112, an interface for the business host 113 for receiving an I/O request from the business host 104, an interface for the management server 114 for receiving commands from the management server 103, an interface for external connection 115 for getting access to the storage system 102, plural hard disks 116 for storing data, and a cache memory 117 for temporarily storing write data, etc. from the business host 104.

The external storage system 102 has a processor 121, a memory 122, an interface for the business host 123 for receiving an I/O request from the outside, an interface for the management server 124 for receiving commands from the management server 103, plural hard disks 126 for storing data, and a cache memory 127 for temporarily storing write data, etc. from the outside. Namely, the external storage system 102 has a construction in which the interface for external connection is removed from the storage system 101.

The management server 103 is a computer, which has a processor 131, a memory 132, an interface 133 for getting access to the storage system 101 and the external storage system 102, a monitor 134 for outputting information to an administrator of the storage system, an input device 135 such as a keyboard, a mouse, etc. for receiving an input from the administrator of the storage system, and a hard disk 136 for storing data.

The storage system 101, the external storage system 102 and the management server 103 respectively realize various kinds of functions described later by executing various kinds of programs stored to the memories 112, 122, 132 by the processors 111, 121, 131.

The business host 104 has a CPU, a memory, etc., and the CPU reads and executes an operation system and an application program stored to the memory so that a predetermined function is achieved.

The storage system 101, the external storage system 102 and the management server 104 will next be explained in detail.

Figure 2:
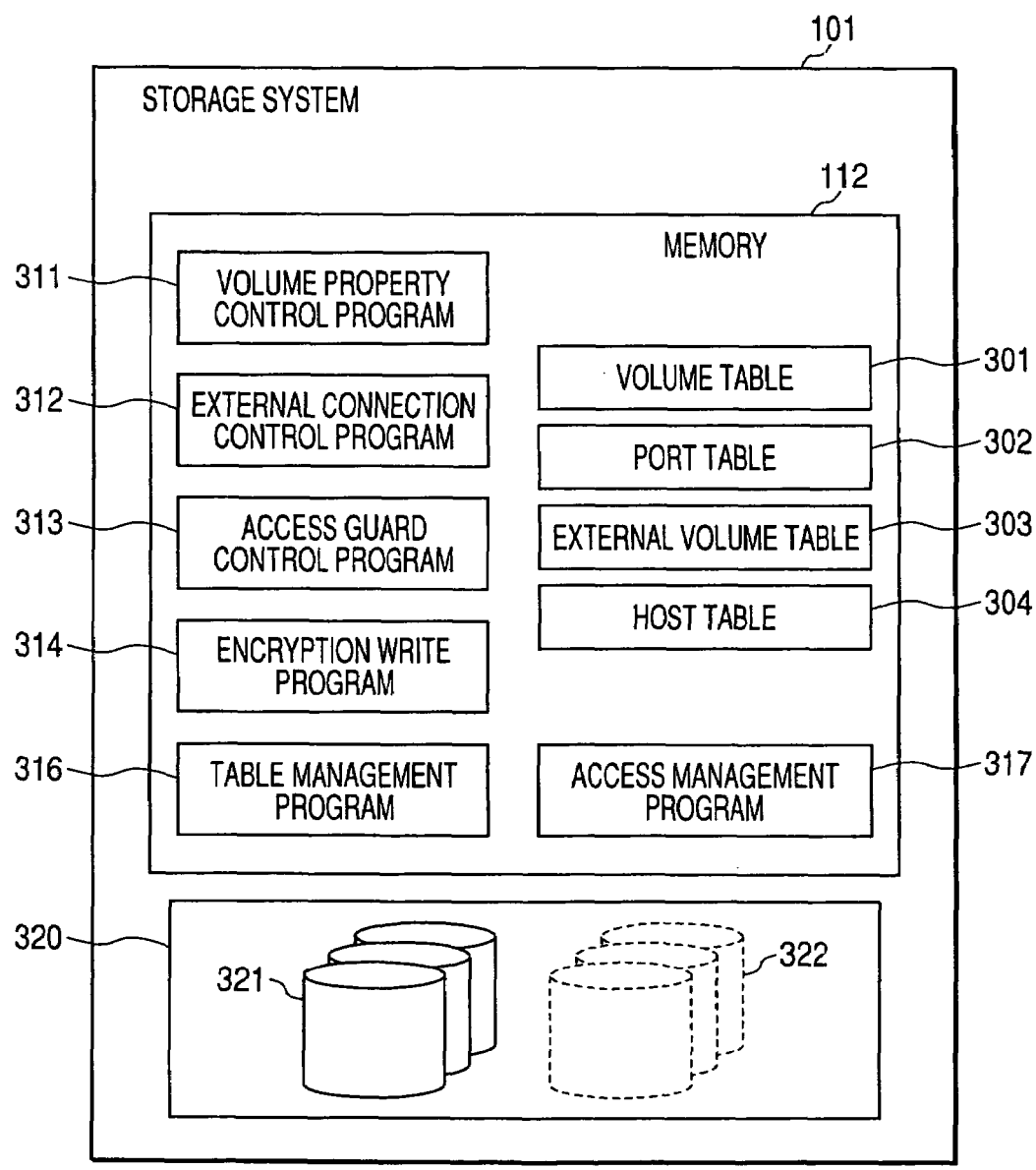
FIG. 2 is a diagram showing an exemplary functional construction of a storage system of this embodiment.

FIG. 2 is a functional construction view of the storage system 101. As shown in this figure, the storage system 101 has a logical volume group 320 having one or plural logical volumes for providing a memory area of the hard disk 116 or the hard disk 126 of the external storage system 102 with the business host 104 as an access target.

In the logical volume constituting the logical volume group 320, there are one or plural real logical volumes 321 and one or plural virtual logical volumes 322. Here, the real logical volume 321 is a logical volume configured from the hard disk 116 of the storage system 101. In contrast to this, the virtual logical volume 322 is provided to the business host 104 as a logical volume of the storage system 101, but the real storing destination of data is set to the logical volume of the external storage system 102. It is called external connection that the external storage system 102 is connected to the storage system 101 so as to provide the logical volume of the external storage system 102 to the business host 104 as the logical volume of the storage system 101.

Each logical volume (the real logical volume 321 and the virtual logical volume 322) constituting the logical volume group 320 is attached to one of ports of the interface for the business host 113.

The storage system 101 attaches an area of the cache memory 117 and information for discriminating the virtual logical volume 322 corresponding to the logical volume of the external storage system 102 to each logical volume of the external storage system 102. The correspondence of the logical volume of the external storage system, the logical volume of the storage system, etc. is called mapping. When there is an access request from the business host 104 to the virtual logical volume 322, the storage system 101 gets access to the mapped logical volume of the external storage system 102 via the interface for external connection 115. The storage system 101 then returns a result replied from the external storage system 102 to the business host 104.

In processing when there is the access request from the business host 104 to the virtual logical volume 322, there are processing using the cache 117 and processing using no cache 117. When there is the access request from the business host 104, a processing mode utilizing the cache 117 is called a cache mode. Namely, when the cache mode is on the cache is used. In contrast to this, when the cache mode is off, no cache is used.

Concretely, when the cache mode is on (valid), the storage system 101 notifies write completion to the business host 104 at a writing time point to the cache 117 with respect to a write request from the business host 104. Data written to the cache 117 are transferred and written to the external storage system 102 in non-synchronization with the write request. Further, if the cache 117 is first retrieved and there are object data in the cache 117 with respect to a read request from the business host 104, the object data are transferred from the cache 117 to the business host 104. In contrast to this, when there are no object data in the cache 117, the read request is transmitted to the external storage system 102. When data are received from the external storage system 102, these data are stored to the cache 117 and are transferred from the cache 117 to the business host 104.

In contrast to this, when the cache mode is off (invalid), the storage system 101 instantaneously transmits the write request to the external storage system 102 with respect to the write request from the business host 104. When the storage system 101 receives the notification of write completion from the external storage system 102, the storage system 101 notifies the write completion to the business host 104. Further, with respect to the read request from the business host 104, the read request is instantaneously transmitted to the external storage system 102, and data are received from the external storage system 102 and are transmitted to the business host 104. When the data are received from the external storage system 102, these data are not written to the cache 117.

A volume table 301, a port table 302, an external volume table 303, a host table 304, a volume property control program 311, an external connection control program 312, an access guard control program 313, an encryption write program 314, a table management program 316 and an access management program 317 are stored to the memory 112 of the storage system 101.

The volume table 301 holds the volume property set to each logical volume constituting the logical volume group 320. The volume table 301 will be described later in detail by using FIG. 9. The port table 302 holds identification data of a host group to which the business host 104 attached in each logical volume and able to be accessed by this logical volume belongs. The port table 302 will be described later in detail by using FIG. 10. The external volume table 303 holds the correspondence of the virtual logical volume 322, the external connection port, and the logical volume of the external storage system 102 attached to this virtual logical volume 322 through this external connection port. The external volume table 303 will be described later in detail by using FIG. 11. The host table 304 holds the corresponding relation of identification data of the port (port ID) of the host connected to the storage system 101, and identification data of the host group to which this port belongs. The host table 304 will be described later in detail by using FIG. 12. These tables may be also collectively held as one table.

The volume property control program 311 is a program for performing processing for changing the volume property of each logical volume constituting the logical volume group 320. When a command for changing the volume property is received, yes or no of the change is judged and the volume property is changed if possible. Here, in this embodiment mode, the volume property able to be set is classified into three kinds constructed by Read/Write property for permitting both read and write accesses, Read Only property for permitting only read, and Protect property for prohibiting both the read and write accesses.

In the volume property control program 311, when the volume property of each logical volume is changed to the Read Only property and the Protect property, a period (retention term) for maintaining this volume property is set in accordance with a command inputted from a user. The retention term is updated with the passage of time.

The external connection control program 312 is a program for performing processing for externally connecting the external storage system 102 to the storage system 101. The external storage system 102 after completion of the external connection processing processes access from the storage system 101 in a method similar to that of the access from the business host 104.

The access guard control program 313 is a program for performing processing for guarding the access to each logical volume. Namely, with respect to each logical volume, processing for attaching the host group constructed from the business host 104 able to be accessed to this logical volume is performed. In this embodiment mode, as mentioned above, the host group is attached to each logical volume in the access guard control program 313. However, with respect to each logical volume, the business host 104 able to be accessed to this logical volume may be also attached. The business host 104 can get access to only the logical volume attached to the host group to which this business host 104 belongs by the access guard control program 313.

The encryption write program 314 is a program for performing processing for encrypting data written from the business host 104 and storing these data to a physical volume corresponding to the logical volume.

The table management program 316 is a program for performing processing for respectively rewriting the volume table 301, the port table 302, the external volume table 303 and the host table 304 in accordance with processings of other programs.

The access management program 317 is a program for executing access to the logical volume.

There is also a case in which no storage system 101 has the volume property control program 311 and the table management program 316.

Figure 3:
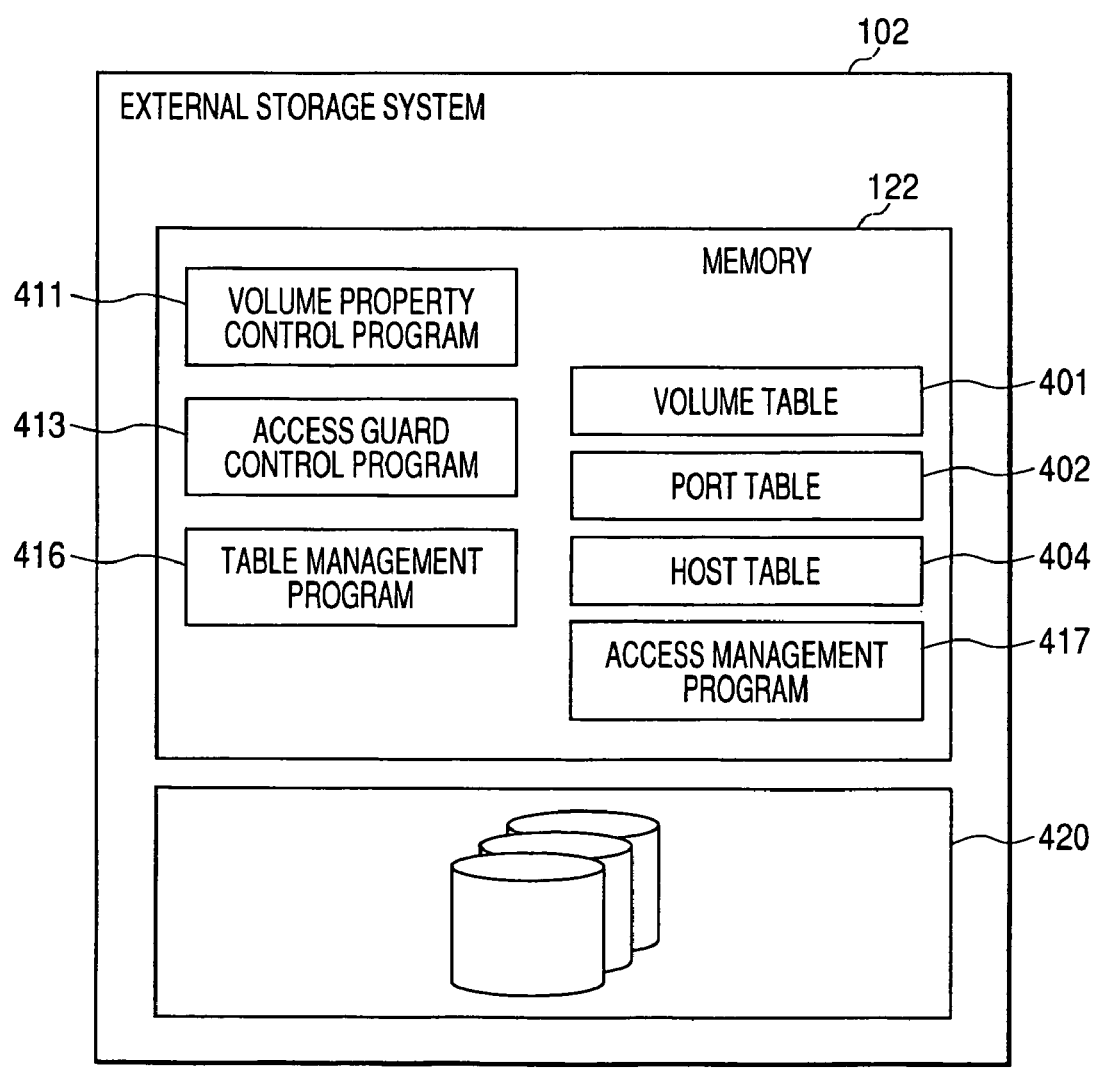
FIG. 3 is a diagram showing an exemplary functional construction of an external storage system of this embodiment.

FIG. 3 is a view of the functional construction of the external storage system 102. As shown in this figure, the external storage system 102 has a logical volume group 420 constructed by the logical volume as one or plural logical memory areas for externally providing the memory area of the hard disk 126. Each logical volume constituting the logical volume group 420 is a real logical volume 421. A volume property control program 411, an access guard control program 413, a table management program 416, a volume table 401, a port table 402, a host table 403 and an access management program 417 are stored to the memory 122. These programs and tables are basically the same as the programs and tables of the storage system 101 of the same name. Namely, no external storage system 102 has the external connection control program 312, the encryption write program 314, the virtual logical volume 322 and the external volume table 303 of the storage system 101. There is also a case in which no external storage system 102 has the volume property control program 411 and the access guard control program 413.

In the access guard control program 313 of the storage system 101, an accessible logical volume is attached to the host group constructed from one or plural business hosts 104. In contrast to this, in the access guard control program 413 of the external storage system 102, the logical volume of the accessible logical volume group 420 is attached to the port of the interface for external connection 115 in the storage system 101.

Figure 4:
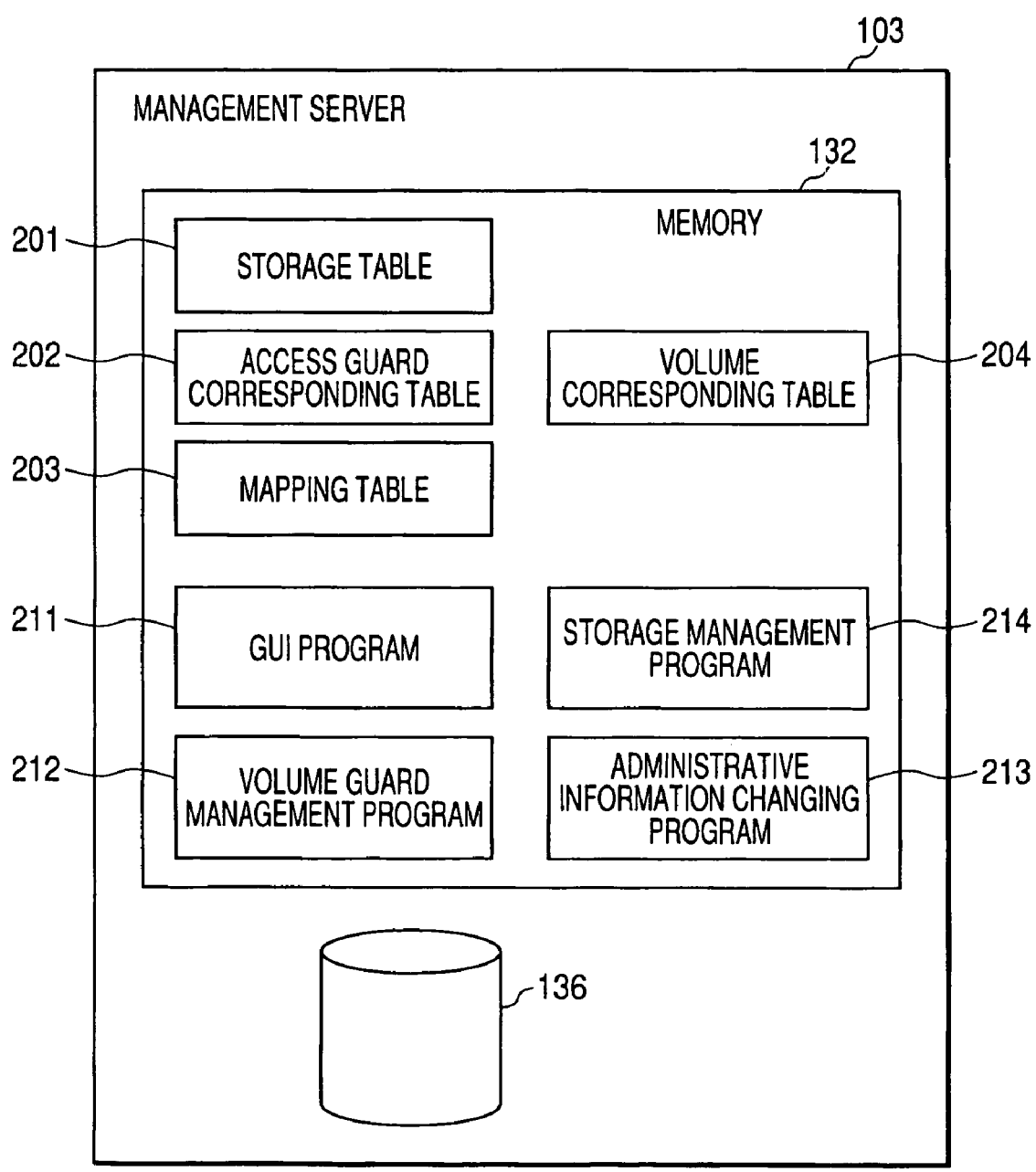
FIG. 4 is a diagram showing an exemplary functional construction of a management server of this embodiment.

FIG. 4 is a view of the functional construction of the management server 103. As shown in this figure, a storage table 201, an access guard corresponding table 202, a mapping table 203, a volume corresponding table 204, a GUI program 211, a volume guard management program 212, a storage management program 214 and an administrative information changing program 213 are stored to the memory 132 of the management server 103.

The storage table 201, the access guard corresponding table 202, the mapping table 203 and the volume corresponding table 204 hold information collected from each of the storage system 101 and the external storage system 102 as a management object of the management server 103, and information set to each of these storage systems. Their details will be respectively described later by using FIGS. 5, 6, 7 and 8. These tables may be also collectively held as one, two or three tables.

The GUI program 211 is a program for displaying the information of the storage system 101 and the external storage system 102 to the monitor 134, and providing an interface for operating the management server 103 to a storage system administrator. The details of a screen as the interface displayed in the monitor 134 by the GUI program 211 will be described later by using FIGS. 13 and 14. Another operation interface such as a command line interface, etc. may be also provided instead of the GUI program 211.

The volume guard management program 212 is a program for respectively giving commands of changes of the volume property of each logical volume constituting the logical volume group 320 and each logical volume constituting the logical volume group 420 to the storage system 101 and the external storage system 102. The volume guard management program 212 acquires a function relating to the volume guard held by the storage system 101 and the external storage system 102, and generates a selection item able to be selected as a system for guarding the volume of the external storage system 102. The generated volume guard system is then presented to the administrator of the storage system, and a selection from the administrator of the storage system is received and commands are given to the storage system 101 and the external storage system 102 so as to guard the external storage system 102 by the received system. At this time, the volume guard management program 212 may be also constructed so as to select an optimum system instead of the construction in which the administrator of the storage system selects the guard system. Their details will be described later by using FIGS. 19 and 20.

The storage management program 214 is a program for extracting necessary information from the storage system 101 and the external storage system 102, and defining the system construction. In this embodiment mode, information required to complete the storage table 201, the access guard corresponding table 202, the mapping table 203 and the volume corresponding table 204 and information required to make a change are concretely acquired. The storage management program 214 may be also set such that information is collected from each storage system (the storage system 101 and the external storage system 102 in this embodiment mode) in arbitrary timing as well as a commanding time from the administrator of the storage system.

The administrative information changing program 213 is a program for updating administrative information. Here, the administrative information is information for managing information acquired from the storage system 101 and the external storage system 102. In this embodiment mode, the administrative information is information held in the storage table 201, the access guard corresponding table 202, the mapping table 203 and the volume corresponding table 204. The administrative information may be also updated by the volume guard management program 212 instead of the administrative information changing program 213.

The storage table 201 holds information of a program relating to the logical volume guard and able to be used in each storage system. FIG. 5 is a view showing one example of the storage table 201. As shown in this figure, the storage table 201 has a storage system name column 501 for storing a storage system name of each storage system, an access guard control column 502 for storing information showing whether the access guard control programs 313, 413 can be used (e.g., whether a program is held) or not, a volume property control column 503 for storing information showing whether the volume property control programs 311, 411 can be used (e.g., a program is held) or not, and an encryption write column 505 for storing information showing whether the encryption write program 314 can be used (e.g., whether a program is held) or not.

Information relating to the access guard property showing whether the access guard using the access guard control programs 313, 413 is performed or not (whether the access guard is valid or invalid) is stored to the access guard corresponding table 202 with respect to the logical volume of each storage system. FIG. 6 is a view showing one example of the access guard corresponding table 202. As shown in this figure, the access guard corresponding table 202 has a storage system name column 601 for storing the storage system name of each storage system, an LU# column 602 for storing identification data for univocally identifying each logical volume, an access guard property column 603 for storing information showing the access guard property of its logical volume, i.e., whether the guard using the access guard control programs 313, 413 is performed in this logical volume or not (whether it is valid or invalid), and a host group column 604 for storing information showing a host group in which the access to this logical volume is permitted when validity is stored to the access guard property column.

LU# as identification data of the logical volume is univocally determined from a port number for discriminating the port on the interface for a host attached with respect to the logical volume, and a logical volume number as an identification number of the logical volume in this port. For example, in an example of AZB1225-001 stored to the LU# column 602 of a first row of the access guard corresponding table 202 of FIG. 6, AZB1225 of the first half is a port number and 001 of the latter half is a logical volume number. The port number is a number for univocally discriminating this port, and is also a unique number such as World Wide Name in the world given in advance.

The mapping table 203 holds information showing the corresponding relation of the logical volume of the storage system (the storage system 101 in this embodiment mode) having the storage system externally connected and the logical volume of this external storage system (the external storage system 102 in this embodiment mode). FIG. 7 is a view showing one example of the mapping table 203. As shown in this figure, the mapping table 203 has an LU# column 701 for storing identification data of the logical volume of the storage system 101, a storage system column 702 for storing the storage system name of the storage system 101, an external LU# column 703 for storing identification data of the logical volume of the external storage system 102, and an external storage system column 704 for storing the storage system name of the external storage system 102.

The volume corresponding table 204 holds the volume property of the logical volume of each storage system, and relative information. FIG. 8 is a view showing one example of the volume corresponding table 204. As shown in this figure, the volume corresponding table 204 has a storage system name column 801 for storing the storage system name of each storage system, an LU# column 802 for storing the identification data of each logical volume, a volume property column 803 for storing information showing the volume property set by the volume property control programs 311, 411 to each logical volume, a volume property retention term column 805 for storing information showing a retention term of the volume property of each logical volume, and an encryption write column 806 for storing information showing whether data are encrypted and written to each logical volume in the encryption write program 314 or not.

The volume table 301 holds the volume property of each logical volume constituting the logical volume group 320, and its relative information. FIG. 9 is a view showing one example of the volume table 301 within the storage system 101. As shown in this figure, the volume table 301 has an LU# column 901 for storing the identification data of each logical volume, a volume property column 902 for storing the volume property set to each logical volume by the volume property control program 311, a cache mode property column 904 for storing information showing whether the cache mode at the external connecting time is valid or invalid with respect to each logical volume, and a volume property retention term column 905 for storing information showing the retention term of the volume property of each logical volume. The validity and invalidity of the cache mode stored to the cache mode property column 904 are stored only when the logical volume is the virtual logical volume 322.

The volume table 401 held in the external storage system 102 basically has a construction similar to that of the volume table 301, and holds the volume property of each logical volume of the logical volume group 420, and its relative information. However, no volume table 401 has a cache mode property column 903.

The port table 302 holds the access guard property of each logical volume of the logical volume group 320, and its relative information. FIG. 10 is a view showing one example of the port table 302. As shown in this figure, the port table 302 has an LU# column 1001 for storing the identification data of each logical volume, an access guard property column 1002 for storing information showing the access guard property of each logical volume, i.e., whether access is guarded by the access guard control program 313 or not (whether it is valid or invalid), and a host group column 1003 for storing information showing a host group in which access is permitted with respect to its logical volume when validity is stored to the access guard property column.

The external volume table 303 has information of the logical volume (here, the logical volume constituting the logical volume group 420 of the external storage system 102) of the connection destination of an external connection port. FIG. 11 is a view showing one example of the external volume table 303. As shown in this figure, the external volume table 303 has an LU# column 1101 for storing identification data of the virtual logical volume 322 of the storage system 101, an external connection port column 1102 for storing a port number of the external connection port used to get access to the logical volume of the external storage system 102, and an external LU# column 1103 for storing the identification data of the logical volume of the external storage system 102 of the connection destination.

The host table 304 shows information of the business host 104 belonging to each host group. FIG. 12 is a view showing one example of the host table 304. As shown in this figure, the host table 304 has a host port column 2301 for storing the name of the port of the business host 104 used to connect the business host 104 to the storage system 101, and a host group column 2302 for storing the host group name of the host group to which this port belongs. The name of the port stored to the host port column 2301 is a number for univocally discriminating the port arranged in the business host 104, and is also a unique number such as World Wide Name in the world given in advance.

Next, the construction of a screen provided as an input-output interface by the GUI program 211 will be explained. In this embodiment mode, with respect to the screen provided by the GUI program 211, there are a volume retrieving screen 1200 for receiving a retrieving command for retrieving the logical volume of an operation object, and a volume property changing screen 1300 for receiving an operation command.

Figure 13:
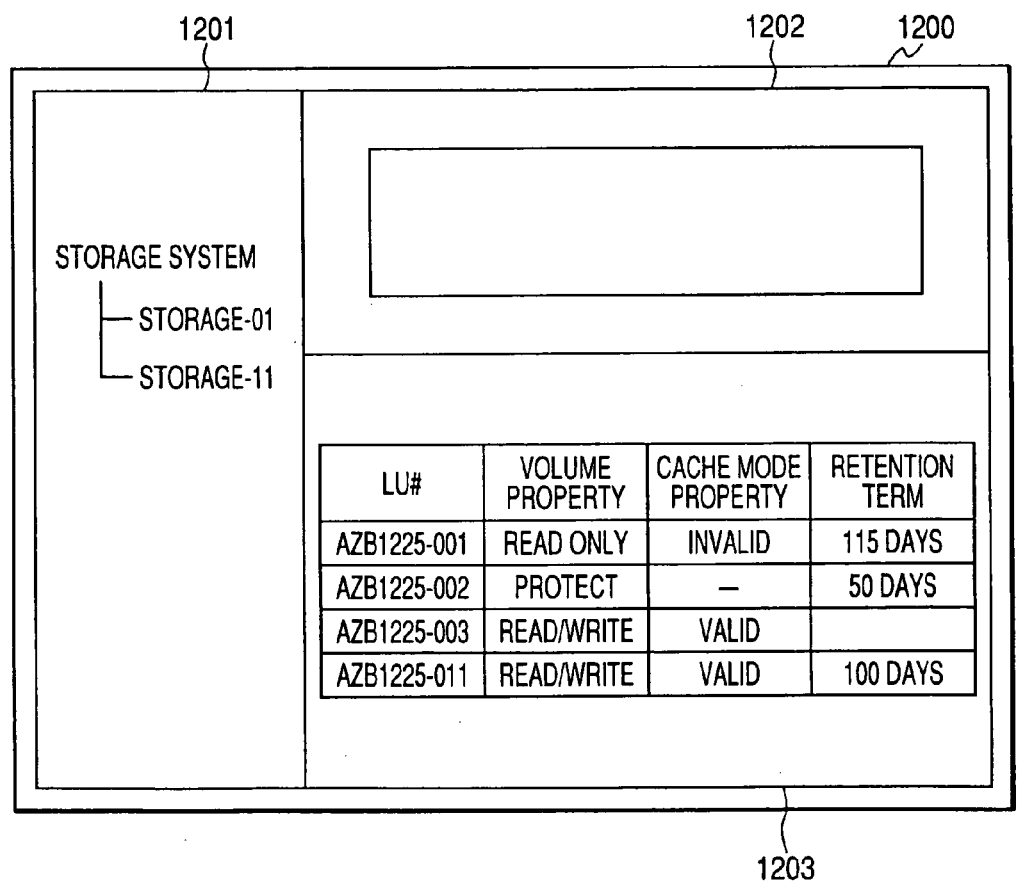
FIG. 13 shows one example of a volume retrieving screen of this embodiment.

FIG. 13 shows one example of the volume retrieving screen 1200 provided by the GUI program 211. The volume retrieving screen 1200 is provided as an interface for extracting the logical volume for changing the volume property. The volume retrieving screen 1200 has a tree review area 1201, a command input area 1202 and a result display area 1203.

In the tree review area 1201, the storage system name of the storage system managed by the management server 103 is displayed. The administrator of the storage system can select the storage system by using the input device 135. In the GUI program 211, the selection of the storage system from the administrator of the storage system is received by a click, etc.

In the result display area 1203, information of the logical volume of the storage system selected by the administrator of the storage system is displayed. The displayed information is extracted from the volume corresponding table 204 with the storage system name as a key with respect to the storage system receiving the selection of the administrator of the storage system through the tree review area 1201 in the GUI program 211.

The command input area 1202 is an area in which the administrator of the storage system inputs a command for an operation. When the input of information of each column of the volume corresponding table 204 is received from the administrator of the storage system as a selecting condition, the logical volume conforming to the condition is selected from the volume corresponding table 204 with the input information as a key in the GUI program 211, and is outputted to the result display section 1203. The input and the display of the retrieving condition are not limited to this method. For example, the input of the volume retrieval and the display of the retrieving result may be also realized by a means such as a command line interface.

Figure 14:
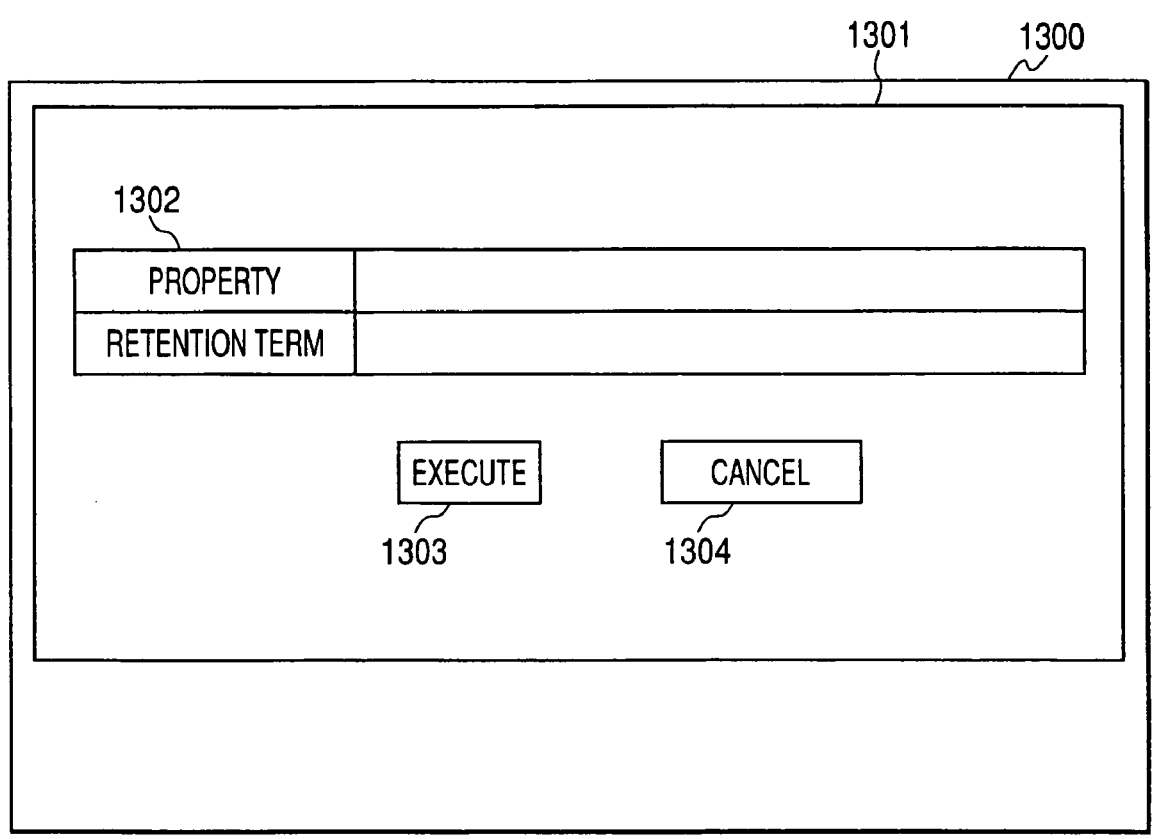
FIG. 14 shows one example of a volume property changing screen of this embodiment.

FIG. 14 shows one example of the volume property changing screen 1300 provided by the GUI program 211. The volume property changing screen 1300 is provided as an interface for receiving various kinds of commands for changing the volume property. The volume property changing screen 1300 has a volume property operation window 1301. The volume property operation window 1301 has a property input area 1302, an execution button 1303 and a cancel button 1304. The administrator of the storage system selects the logical volume desirous to change the volume property from the logical volume extracted through the volume retrieving screen 1200, and inputs the property desirously changed and the retention term of its property to the property input section 1302. Namely, in the GUI program 211, a command for specifying the logical volume of a volume property changing object, a command of the property to be changed, the retention term, etc. are received from the administrator of the storage system.

The execution button 1303 receives the intention of execution of a command receiving the input, and the cancel button 1304 receives an intention in which no command receiving the input is executed. Namely, the administrator of the storage system selects the execution button 1303 when the administrator of the storage system executes the inputted property changing command. In contrast to this, when the administrator of the storage system does not execute the property changing command, the administrator of the storage system selects the cancel button 1304. Namely, in the GUI program 211, commands are given to the volume guard management program 212 so as to execute the change receiving the input when the selection of the execution button 1303 is received. When the selection of the cancel button 1304 is received, no command for executing the change is given to the volume guard management program 212. The input of the command of the property change, etc. are not limited to the present method. For example, this input, etc. may be also realized by a means such as a command line interface.

The operation of each processing will next be explained.

First, processing at a system construction defining time and processing at a volume registration operating time will be explained. The system construction defining processing is processing performed in constructing the system (initial period) and changing the system construction.

Tables respectively held in the above storage system 101 and the external storage system 102 are made by registering the construction of each storage system by the management server 103, and registering information relating to the volume to the tables in accordance with commands of the management server 103 on each storage system side. Each table arranged in the management server 103 is updated by the information acquired from the tables arranged in the storage system 101 and the external storage system 102 and the contents of commands given to the storage system 101 and the external storage system 102 by the management server 103.

Figure 15:
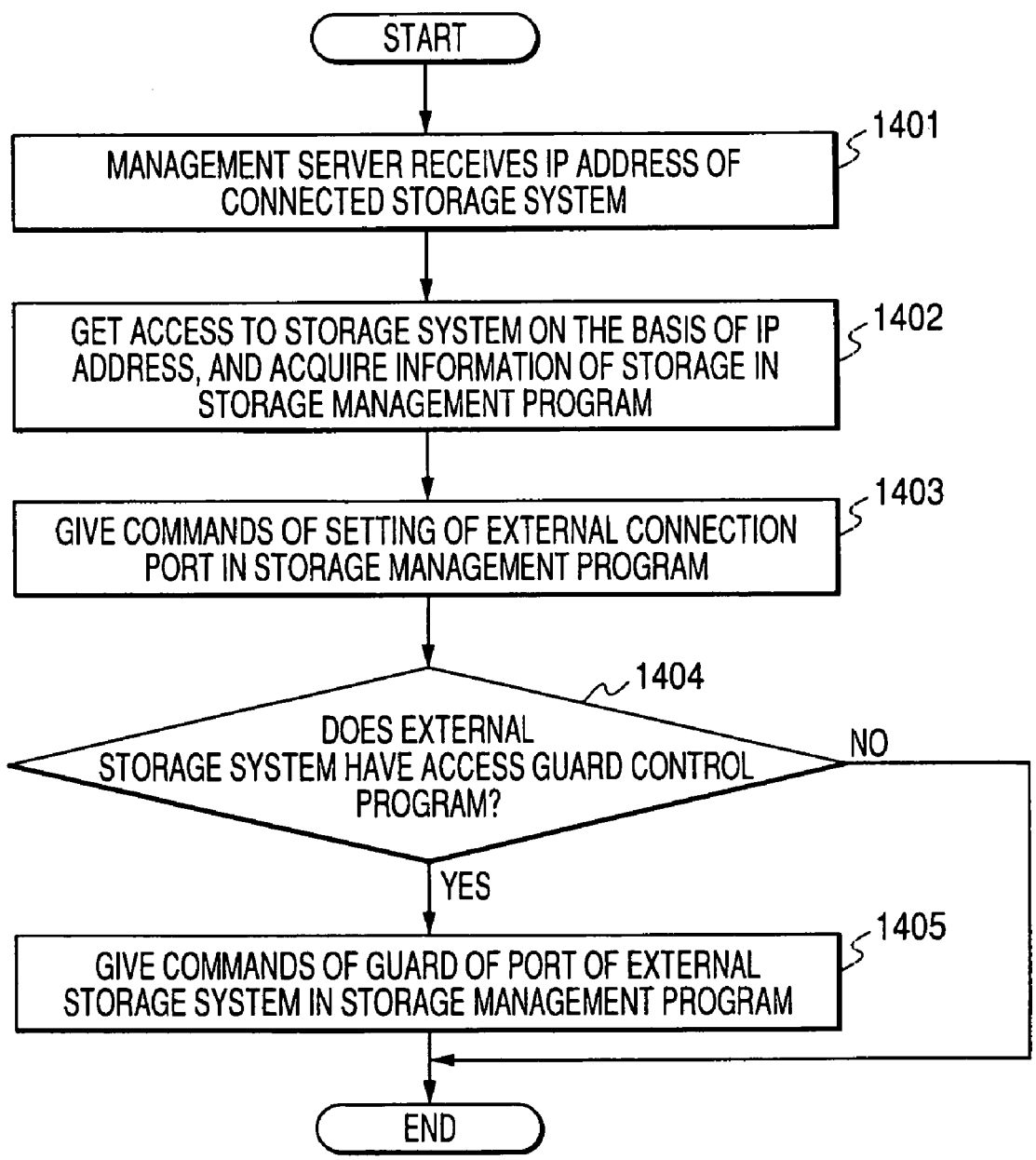
FIG. 15 is a flow chart showing one example of the operation of the management server when the system configuration of this embodiment is defined.

First, the operation of the management server 103 at the system construction defining time will be explained. FIG. 15 is a flow chart showing one example of the operation of the management server 103 at the system construction defining time.

The management server 103 acquires information for getting access to the connected storage system 101 and external storage system 102. Namely, the management server 103 receives IP addresses of the storage system 101 and the external storage system 102, or information for getting access to the storage system 100 from the administrator of the storage system (step 1401).

In the storage management program 214, accesses are respectively gotten to the storage system 101 and the external storage system 102 with the received IP address as a source. The logical volume arranged in each storage system, the host group permitted in access to each logical volume, and information of a program usable in each storage system are then acquired. In the administrative information changing program 213, the acquired information is written to predetermined columns of the storage table 201, the access guard corresponding table 202 and the volume corresponding table 204 (step 1402).

In the storage management program 214, commands are given to the storage system 101 such that the port of the interface for external connection 115 is connected to the port of the external storage system 102 as an external connection port. In the administrative information changing program 213, when set information is received from the storage system 101 together with the notification of setting completion, the received information (set information) is written to the external LU# column 703 and the external storage system column 704 of the mapping table 203 (step 1403).

In the storage management program 214, access is gotten to the storage table 201, and it is discriminated whether the external storage system 102 connected to the external connection port of the storage system 101 holds the access guard control program 413 or not (step 1404). When the external storage system 102 holds the access guard control program 413, commands are given to the external storage system 102 such that only the access from the external connection port is permitted with respect to the logical volume of the external storage system 102 accessed from the port of the external storage system 102 connected to the external connection port of the storage system 101. In the administrative information changing program 214, when the notification of the setting completion is received from the external storage system 102, a change of the access guard property column 603 of the access guard corresponding table 202 is made (step 1405), and the processing is terminated. In contrast to this, when it is discriminated in the step 1404 that no external storage system 102 holds the access guard control program 413, the processing is terminated.

Figure 16:
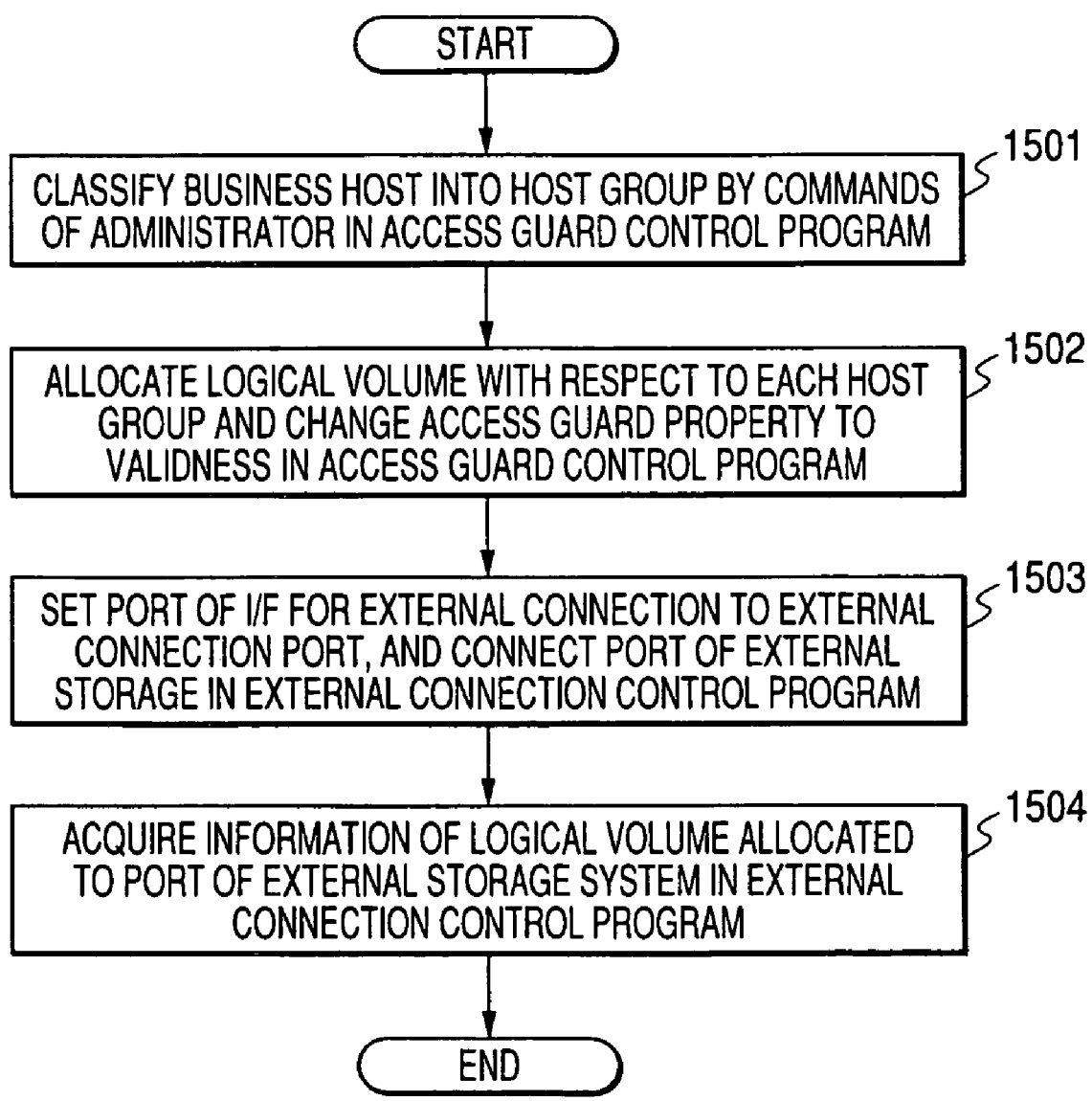
FIG. 16 is a flow chart showing one example of the operation of the storage system when the system configuration of this embodiment is defined.

FIG. 16 is a flow chart showing one example of the operation of the storage system 101 at the system construction defining time.

In the access guard control program 313 of the storage system 101, the business host 104 connected to the storage system 101 is classified into a host group by commands of the administrator of the storage system, and is written to the host table 304 in the table management program 316 (step 1501).

In the access guard control program 313, the logical volume is attached and the access guard property is changed to validity with respect to each host group, and a processing result is registered to the port table 302 and a setting operation is performed so as to permit only the access from the business host 104 belonging to the corresponding host group with respect to each logical volume (step 1502).

In the external connection control program 312, the port of the interface for external connection 115 is defined as an external connection port in accordance with commands of the storage management program 214 of the management server 103. The port of the interface 123 for a host in the external storage system 102 is then attached to this external connection port, and an access path from this port of the external storage system 102 to an accessible logical volume is set (step 1503).

In the external connection control program 312, information of the logical volume within the logical volume group 420 accessible from the port of the interface 123 for a host in the external storage system 102 connected to the external connection port defined in the step 1503 is acquired. In the table management program 316, the acquired information is written to the external connection port column 1102 and the external LU# column 1103 of the external volume table 303 (step 1504), and the processing is terminated. In the external connection control program 312, when the writing is completed, the setting is notified together with the information set to the management server 103.

At the system construction defining time, the external storage system 102 receives commands from the management server 103 in a step 1405 of FIG. 15, and executes processing corresponding to steps 1501, 1502 of FIG. 16. In the access guard control program 413 of the external storage system 102, the identification data of the external connection port of the storage system 101 is registered to the host table 404 instead of the host group in steps 1501 and 1502 such that the identification data of the logical volume arranged in the external storage system 102 corresponds to this identification data of the external connection port. With respect to the logical volume accessible from the port of the external storage system 102 connected to the external connection port, a setting operation is performed so as to permit only the access from the external connection port. Setting completion is notified to the management server 103 together with the set information of the host table 404.

An explanation will next be made with respect to an operation at the volume registration operating time as an operation for attaching the logical volume constituting the logical volume group 420 of the external storage system 102 as the virtual logical volume 322 of the storage system 101.

Figure 17:
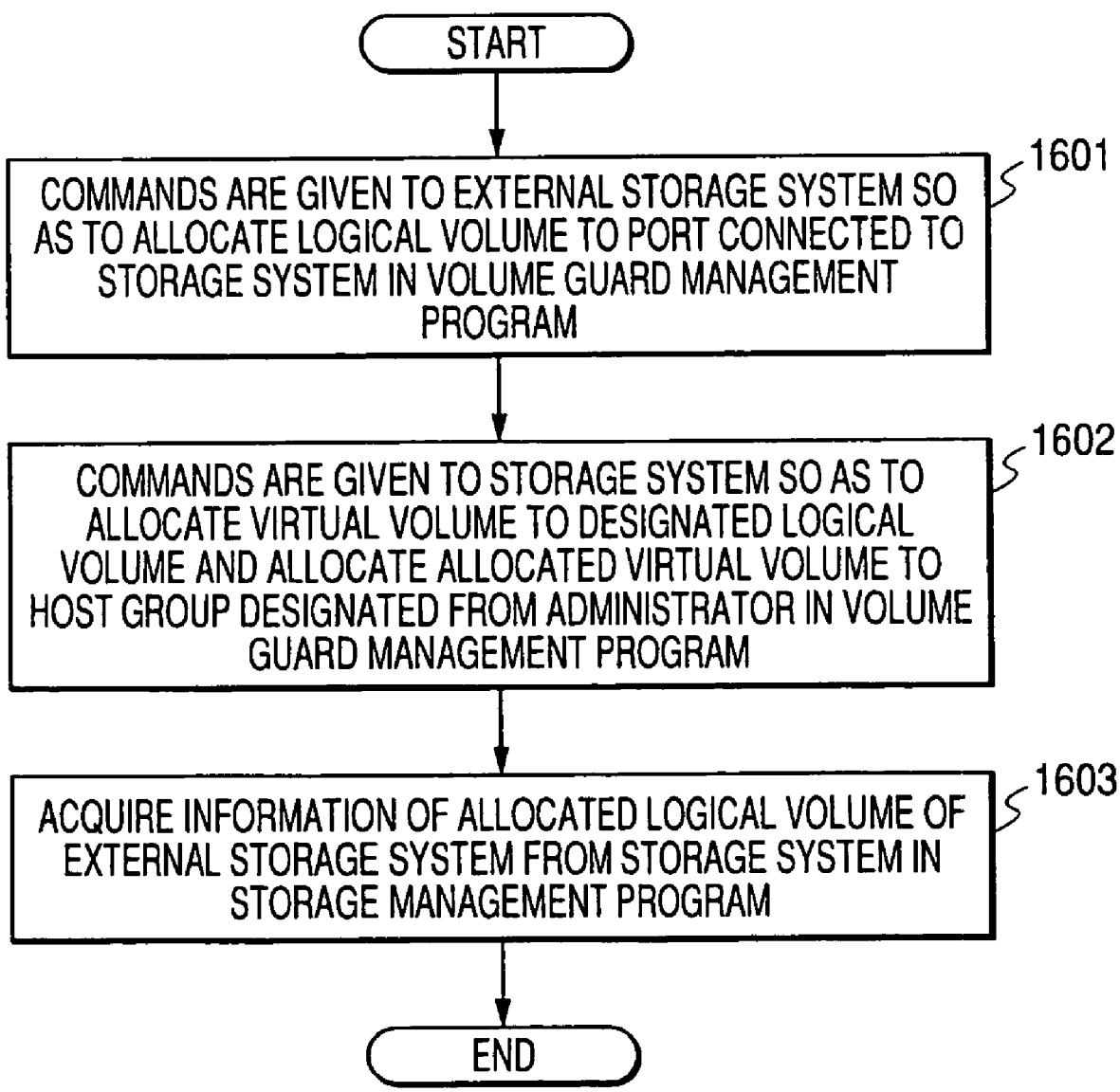
FIG. 17 is a flow chart showing one example of the operation of the management server at a volume registration operating time of this embodiment.

The operation of the management server 103 at the volume registration operating time will first be explained. FIG. 17 is a flow chart showing one example of the operation of the management server 103 at the volume registration operating time.

In the volume guard management program 212 of the management server 103, the logical volume of the external storage system 102 held in the volume corresponding table 204 is presented to a user, and the command of a selection is received from the user. A command is then given to the external storage system 102 so as to set that the logical volume selected by the user is attached to a port connected to the external connection port of the storage system 101, i.e., this logical volume can be accessed from this port (step 1601). On the basis of this command, the external storage system 102 attaches the designated logical volume to the port connected to the external connection port of the storage system 101, and is operated so as to get access to this logical volume from this port. In this case, the access guard control program 413 of the external storage system 102 may be also set so as to execute processings corresponding to the above steps 1501, 1502, and permit the access from only the external connection port of the storage system 101 with respect to this logical volume.

In the volume guard management program 212, commands are given to the storage system 101 such that the virtual logical volume 322 is attached to the logical volume designated in the step 1601, and this virtual logical volume 322 is further attached to the host group designated from the administrator of the storage system (step 1602).

In the storage management program 214, information of the notification of attachment completion, the corresponding relation of the virtual logical volume 322 and the logical volume of the logical volume group 420, and the corresponding relation of the virtual logical volume 322 and the host group is acquired from the storage system 110. In the administrative information changing program 213, the received information is written to the access guard corresponding table 202 and the mapping table 203 (step 1603), and the processing is terminated.

Figure 18:
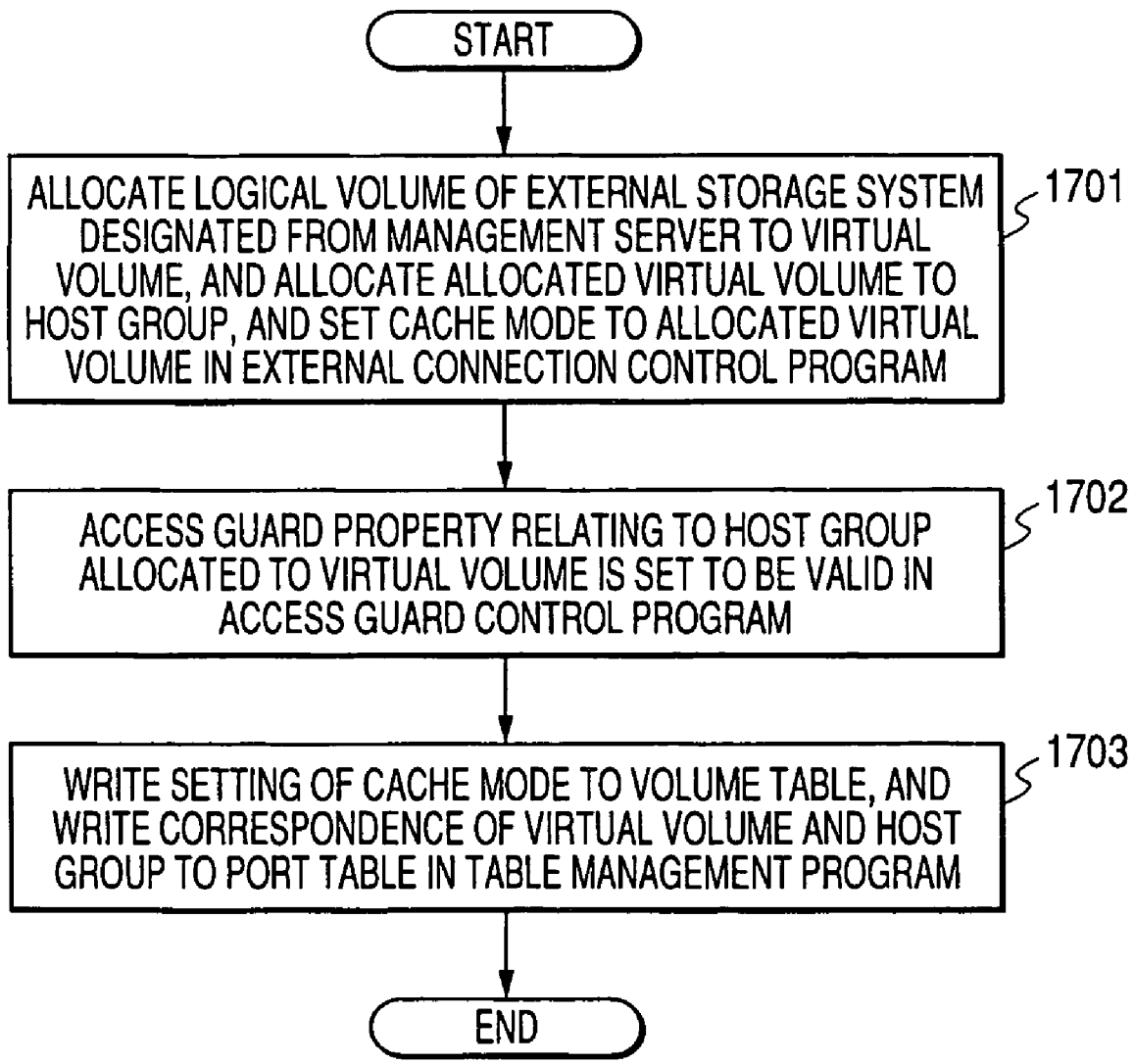
FIG. 18 is a flow chart showing one example of the operation of the storage system at the volume registration operating time of this embodiment.

Next, the operation of the storage system 101 at the volume registration operating time will be explained. FIG. 18 is a flow chart showing one example of the operation of the storage system 101 at the volume registration operating time.

In the external connection control program 312 of the storage system 101, the logical volume of the external storage system 102 commanded from the management server 103 is attached to the virtual logical volume 322, and this virtual logical volume 322 is further attached to the host group designated from the management server 103. Further, in the external connection control program 312, setting as to whether it corresponds to setting of the cache mode or not is performed with respect to this virtual logical volume 322 in accordance with the commands from the management server 103 (step 1701).

In the access guard control program 313, the access guard property relating to the host group designated from the above management server 103 with respect to the above virtual logical volume 322 is set to be valid (step 1702).

In the table management program 316, the cache mode set in the step 1701 is written to the volume table 301, and the correspondence of the host group and the identification data (LU#) of the logical volume of the virtual logical volume 322 attached in the step 1702 is written to the port table 302. Further, the access guard property is changed to validity (step 1703), and the processing is terminated.

Next, processing at a volume guard operating time will be explained. In this embodiment mode, the volume guard operation is processing performed when the change of the volume property of the logical volume constituting the logical volume group 320 is received.

Figure 19:
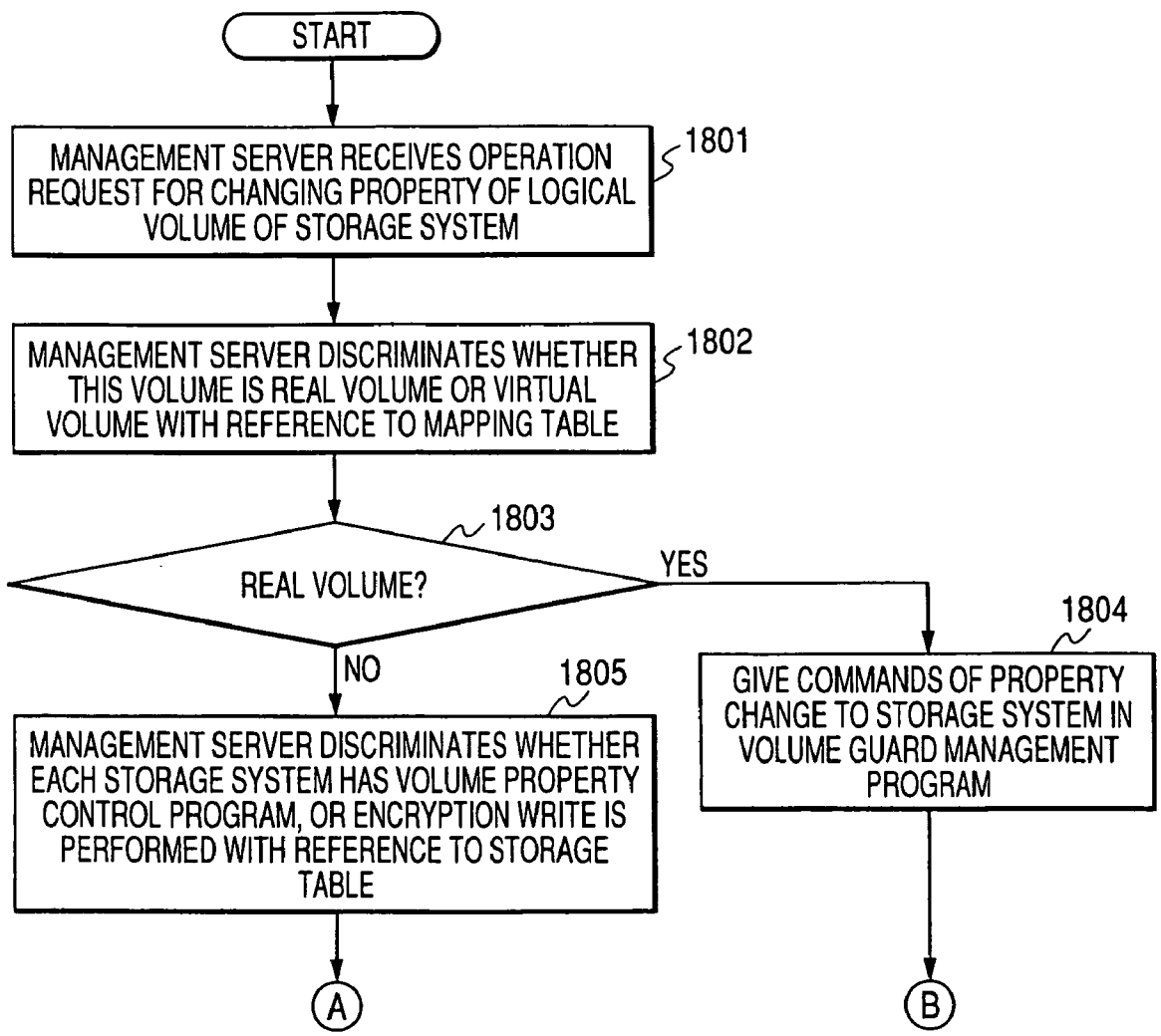
FIG. 19 is a flow chart showing one example of the operation of the management server at a volume guard operating time of this embodiment.
Figure 20:
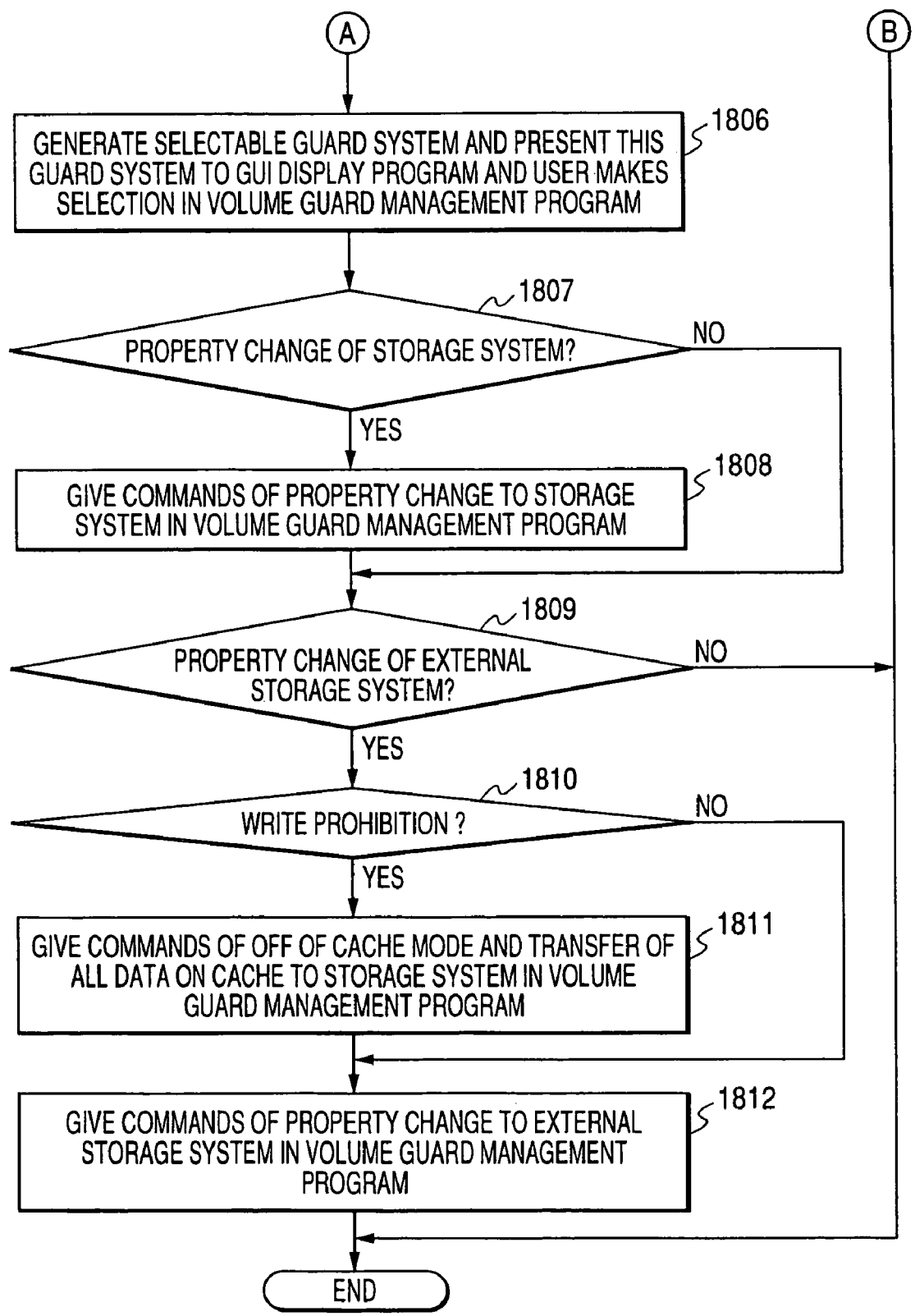
FIG. 20 is a flow chart showing one example of the operation of the management server at the volume guard operating time of this embodiment.

First, the processing of the management server 103 will be explained. FIGS. 19 and 20 are flow charts showing one example of the operation of the management server 103 at the volume guard operating time.

The management server 103 receives an operation request for changing the property of the logical volume of the storage system 101 from the administrator of the storage system (step 1801).

In the volume guard management program 212, with reference to the mapping table 203, it is discriminated whether the logical volume designated from the administrator of the storage system is the real logical volume 321 or the virtual logical volume 322 (steps 1802, 1803). Concretely, when the identification data of the logical volume of the external storage system 102 is stored to the external LU# column 703 correspondingly to the identification data of the logical volume designated from the administrator of the storage system, this logical volume 320 is discriminated as the virtual logical volume 322.

When the designated logical volume is the real logical volume 321, commands of the property change are given to the storage system 101 in the volume guard management program 212 (step 1804).

In contrast to this, when the designated logical volume is the virtual logical volume 322, a guard function able to be provided by the storage system (here, the storage system 101) providing the designated logical volume to the business host 104 as the virtual logical volume 322, and a guard function able to be provided by the storage system (here, the external storage system 102) holding the real logical volume of the logical volume corresponding to the virtual logical volume 322 are extracted in the volume guard management program 212 (step 1805). It then proceeds to a step 1806 of FIG. 20.

Concretely, with reference to the mapping table 203, a storage system name stored to the storage system column 702 and an external storage system name stored to the external storage system column 704 in an entry for storing the identification data of the logical volume of the designated virtual logical volume 322 to the LU# column 701 are extracted. With reference to the storage table 201, a function held in each storage system is then extracted. Namely, with reference to the volume property control column 503 and the encryption write column 505 of the entry storing the extracted storage system name to the storage system name column 501, it is specified whether the storage system (here, the storage system 101) holding the virtual logical volume 322 as the designated logical volume holds the volume property control program 311, or holds the encryption write program 314. It is also specified whether the storage system (here, the external storage system 102) holding the real logical volume of the virtual logical volume 322 holds the volume property control program 311.

In the volume guard management program 212, at least one guard system option selectable to guard the virtual logical volume 322 designated as the logical volume constituting the logical volume group 420 of the external storage system 102 is generated by using the volume guard function held in the storage system 101 and the external storage system 102 specified in the step 1805 of FIG. 19. In the GUI display program 212, the generated guard system option is then displayed and the administrator of the storage system makes a selection (step 1806).

Here, the selectable volume guard system displayed by the GUI program 211 is determined by whether encryption write is performed in a program held in each of the storage system 101 and the external storage system 102, and the virtual logical volume 322 or not, and whether the virtual logical volume 322 and the logical volume of the external storage system 102 are access-guarded or not. Here, a state in which the access to the logical volume included in the logical volume group 420, which is associated with the virtual logical volume of the storage system 110, is permitted in only the external connection port of the storage system 101 by the access guard control program 413 of the external storage system 102, is expressed as "the logical volume of the external storage system 102 is access-guarded". A state in which the access to the virtual logical volume 322 is permitted in only a specific host group by the access guard control program 313 of the storage system 101, is expressed as "the virtual logical volume 322 is access-guarded".

The examples of the selectable volume guard systems (i.e. options) are shown below.

Case 1) When the storage system 101 and the external storage system 102 respectively hold the volume property control programs 311, 411, and the logical volumes of the external storage system 102 are access-guarded, three options shown below are possible to select for guarding the volume.

Option 1: A system for guarding the volume by both the storage system 101 and the external storage system 102 (i.e. A system in which the property change of the volume is made by both of the volume property control programs 311 and 411) Option 2: A system for guarding the volume in the storage system 101 (i.e. A system in which the property change of the volume is made by the volume property control program 311) Because the logical volumes of the external storage system 102 are access-guarded, only the storage system 101 is permitted to access the logical volume of the external storage system 102. Therefore, if a volume property of a virtual logical volume corresponding to the logical volume of the external storage system 102 is changed by the volume property control program 311, accesses to the logical volume of the external storage system 102 via the storage system 101 can be guarded, and so the logical volume of the external storage system 102 is guarded.

Option 3: A system for guarding the volume in the external storage system 102. (i.e. A system in which the property change of the volume is made by the volume property control program 411)

Concretely, for example, when the read and write prohibition to the virtual logical volume must be set as the volume guard, these three options shown below are generated by the volume guard management program 212, and outputted by the GUI display program 211.

Option A: The volume property of the virtual logical volume 322 is set to the read and write prohibition by the volume property control program 311 and further the volume property of the logical volume in the external storage system 102, which is corresponded to the virtual logical volume, is set to the read and write prohibition by the volume property control program 411.

Option B: The volume property of the virtual logical volume 322 is set to the read and write prohibition by the volume property control program 311.

Option C: The volume property of the logical volume in the external storage system 102, which is corresponded to the virtual logical volume, is set to the read and write prohibition by the volume property control program 411.

Case 2) When the storage system 101 and the external storage system 102 respectively hold the volume property control programs 311, 411, and the logical volumes of the external storage system 102 are not access-guarded, the Option 1 and the Option 3 shown above are possible to select for guarding the virtual logical volume.

Concretely, for example, when the read and write to the virtual logical volume must be set to prohibition as the volume guard, these two options shown below are generated by the volume guard management program 212, and outputted by the GUI display program 211.

Option A: The volume property of the virtual logical volume 322 is set to the read and write prohibition by the volume property control program 311 and further the volume property of the logical volume in the external storage system 102, which is corresponded to the virtual logical volume, is set to the read and write prohibition by the volume property control program 411.

Option C: The volume property of the logical volume in the external storage system 102, which is corresponded to the virtual logical volume, is set to the read and write prohibition by the volume property control program 411.

Moreover, when the encryption write is performed (i.e. when the storage system 101 has the encryption write program 314 and the encryption write program 314 is used), it is possible to permit only the storage system 101 to decrypt data in the logical volume in the external storage system 102, which is corresponded to the virtual logical volume, and prohibit write accesses to the logical volume in the external storage system 102 by setting the volume property of the logical volume "read only" by the volume property control program 411. In this case, the write accesses to the logical volume in the external storage system 102 are prohibited by the volume property control program 411. Moreover, if some computers access the logical volume in the external storage system 102 not via the storage system 101, they can read data but not decrypt it. Therefore, if the encryption write is performed, the volume guard management program 212 can make the GUI display program 211 output a notice saying that a volume guard level almost same as the volume guard level by setting the volume property of the logical volume in the external storage system 102 "protect" by the volume property control program 411 can be realized against access sources except for the storage system 101 by setting the volume property of the logical volume in the external storage system "read only".

Case 3) When the storage system 101 does not hold the volume property control program 311 but the external storage system 102 holds the volume property control program 411, the Option 3 shown above is possible to select for guarding the virtual logical volume. Therefore, the Option 3 is generated and presented.

In the Case 3, if the logical volumes of the external storage system 102 are access-guarded, it is possible to permit only the storage system 101 to access the logical volume in the external storage system 102.

On the other hand, even if the logical volumes of the external storage system 102 are not access-guarded, if the encryption write is performed, it is possible to permit only the storage system 101 to decrypt data in the logical volume in the external storage system 102, which is corresponded to the virtual logical volume, and prohibit write accesses to the logical volume in the external storage system 102 by setting the volume property of the logical volume "read only" by the volume property control program 411. Therefore, if the encryption write is performed, the volume guard management program 212 can make the GUI display program 211 output a notice saying that a volume guard level almost same as the volume guard level by setting the volume property of the logical volume in the external storage system 102 "protect" by the volume property control program 411 can be realized against access sources except for the storage system 101 by setting the volume property of the logical volume in the external storage system "read only".

Case 4) When the storage system 101 holds the volume property control program 311, the external storage system 102 doesn't hold the volume property control program 411, and the logical volumes of the external storage system 102 are access-guarded, it is possible to select the Option 2 shown above for guarding the virtual logical volume. Therefore, this option is generated and presented.

Case 5) When the storage system 101 holds the volume property control program 311, the external storage system 102 doesn't hold the volume property control program 411, and the logical volumes of the external storage system 102 are not access-guarded, it is possible to select the Option 2 shown above for guarding the virtual logical volume. Therefore, this option is generated and presented. However, in the Case 5, the Option 2 can prohibit accesses to the logical volumes in the external storage system 102 via the storage system 101, but can not prohibit accesses to the logical volumes in the external storage system 102 not via the storage system 101. This is because the logical volumes in the external storage system 102 are not access-guarded and the external storage system 102 does not hold the volume property control program 411.

In this case, if the encryption write is performed, it is possible to permit only the storage system 101 to decrypt data in the logical volume in the external storage system 102, which is corresponded to the virtual logical volume, but write accesses not via the storage system 101 could not be prohibited.

Case 6) When neither the storage system 101 nor the external storage system 102 hold the volume property control program 311, 412, there is no option to select. Therefore, a message notifying it is generated and presented. Moreover, the process of the volume guard management program 212 has been finished in this Case 6, because there are no options to select (not described in FIG. 20). In this Case 6, if the encryption write is performed, it is possible to permit only the storage system 101 to decrypt data in the logical volume in the external storage system 102, which is corresponded to the virtual logical volume, but write accesses not via the storage system 101 could not be prohibited.

Returning to FIG. 20, in the volume guard management program 212, one option selected by the administrator of the storage system is received. It is then discriminated whether the volume guard system according to the option designated by the administrator of the storage system shows a change of the volume property of the logical volume of the storage system 101 or not (step 1807).

When the change of the volume property of the logical volume of the storage system 101 is shown, commands are given to the storage system 101 so as to change the volume property in the volume guard management program 212 (step 1808). In contrast to this, when no change of the volume property of the storage system 101 is required, it proceeds to a step 1809.

On the other hand, in the volume guard management program 212, it is discriminated whether the volume guard system designated by the administrator of the storage system shows the change of the volume property of the logical volume of the external storage system 102 or not (step 1809).

When the change of the volume property of the external storage system 102 is shown, it is discriminated in the volume guard management program 212 whether this property change shows the write prohibition or the write and read prohibition (step 1810).

When the property change shows the write prohibition or the write and read prohibition, the commands of off of the cache mode and transfer of all data with the cache 117 are given to the storage system 101 in the volume guard management program 212 (step 1811). In the external connection control program 312 of the storage system 101, the cache mode of the volume table 301 is rewritten to off, and all data left in the cache 117 in write data with respect to the virtual logical volume 322 are written to the storage system 102. When write completion notification is received from the external storage system 102, the notification of cache mode change completion is outputted to the management server 103 in the external connection control program 312.

In contrast to this, when no property change shows the write prohibition or the write and read prohibition, it proceeds to a step 1812 as it is.

In the volume guard management program 212, commands are given to the external storage system 102 so as to change the volume property (step 1812), and the processing is terminated. When no change of the volume property of the external storage system 102 is required in the step 1809, the processing is terminated as it is.

Figure 21:
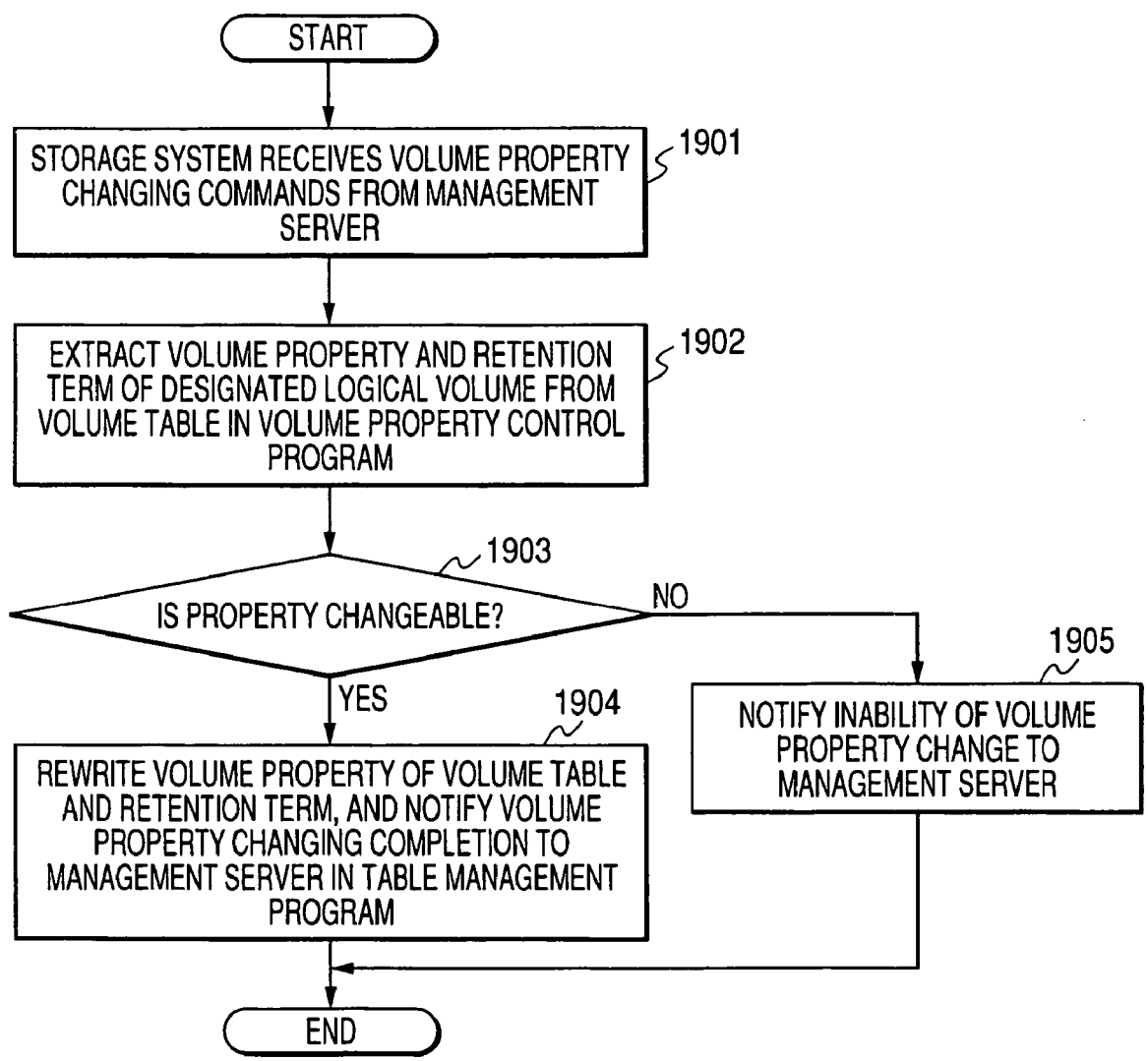
FIG. 21 is a flow chart showing one example of an operation in which the storage system of this embodiment changes volume properties.

Next, an explanation will be made with respect to an operation in which the storage system 101 commanded so as to change the volume property in the volume guard management program 212 changes the volume property. FIG. 21 is a flow chart showing one example of the operation for changing the volume property by the storage system 101. The external storage system 102 also performs a similar operation when the external storage system 102 receives a command from the volume guard management program 212.

The storage system 101 receives the command for changing the volume property of a specific logical volume from the management server 103 (step 1901). The command of the change of the volume property includes information for specifying the logical volume for changing the volume property, the volume property and the retention term.

In the volume property control program 311, the volume property set at present to the logical volume commanded so as to change the volume property, and its retention term are extracted from the volume table 301 (step 1902). Concretely, with reference to the volume table 301, the volume property and the retention term stored to the volume property column 902 and the retention term column 905 correspondingly to LU# as identification of the logical volume designated from the management server 103 are read.

In the table management program 316, it is judged whether or not the volume property can be changed from the change command from the management server 103 and a read result (step 1903). Here, it is judged that the volume property can be changed when it conforms to one of the following conditions.

1. A case in which the property set at present is Read/Write property.
2. A case in which the property set at present is Read Only property or Protect property, and the retention term is 0.
3. A case in which the property is the same and the retention term is extended.
4. A case in which the property set at present is Read Only property and the changed property is Protect property of a retention term longer than the retention term set at present.

As mentioned above, no change of the volume property for shortening the retention term is received in the volume property control program 311. Namely, when it is set to the Protect property, no change to another property can be made during the retention term. Further, when it is set to the Read Only property, the property can be changed to only the Protect property having a retention term equal to or longer than the left retention term during the retention term. A longer retention term can be set with respect to each of the Read Only property or the Protect property. Thus, the retention term can be extended.

When it is judged that it conforms to the above conditions and the volume property can be changed, the volume property and the retention term of the volume table 301 are rewritten in the table management program 316, and it is notified to the management server 103 that the change of the volume property is completed (step 1904), and the processing is terminated.

In contrast to this, when it is judged that no volume property can be changed, it is notified to the management server 103 that no volume property can be changed (step 1905), and the processing is terminated.

Figure 22:
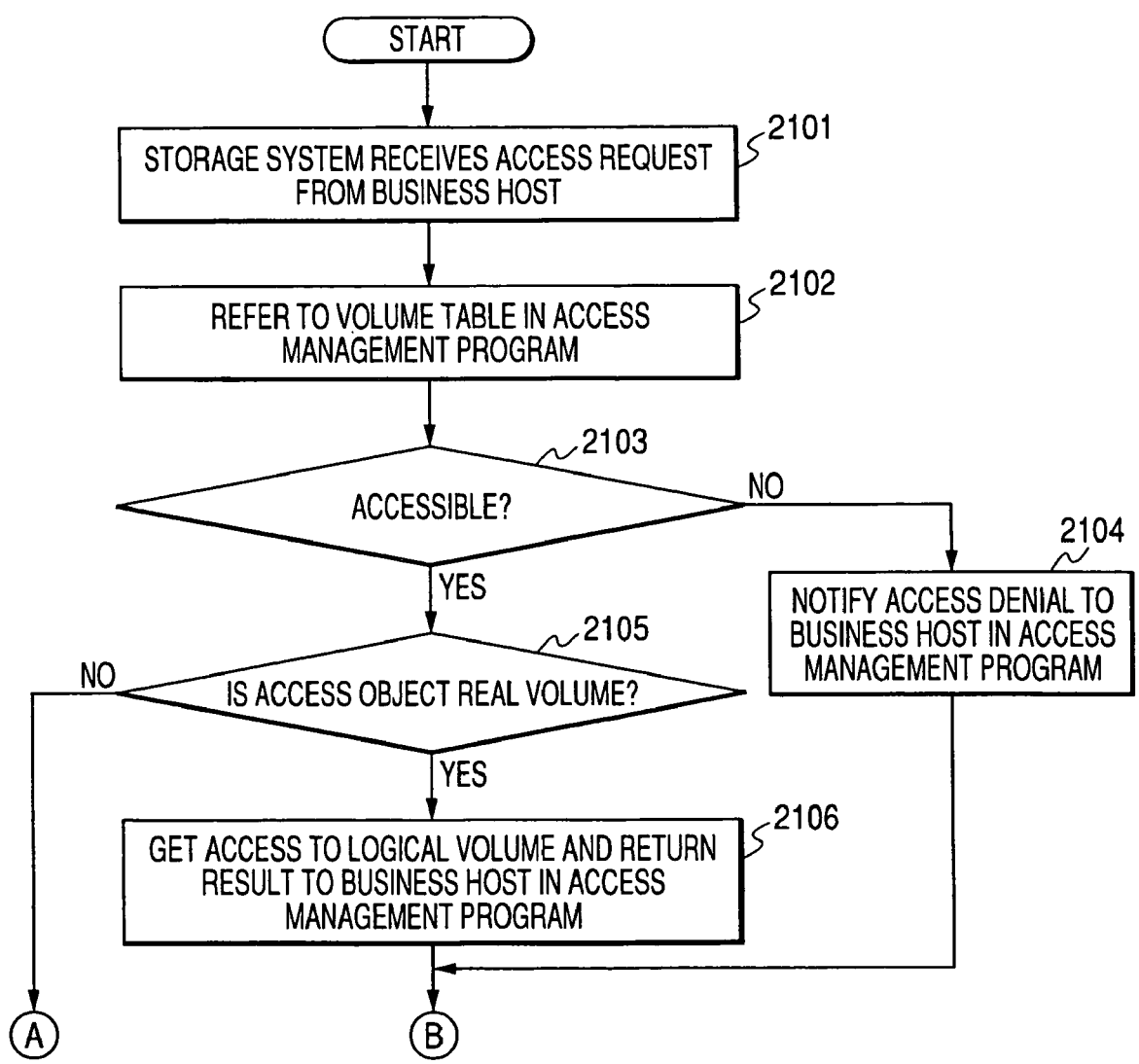
FIG. 22 is a flow chart showing one example of an operation when the storage system of this embodiment receives an access request.
Figure 23:
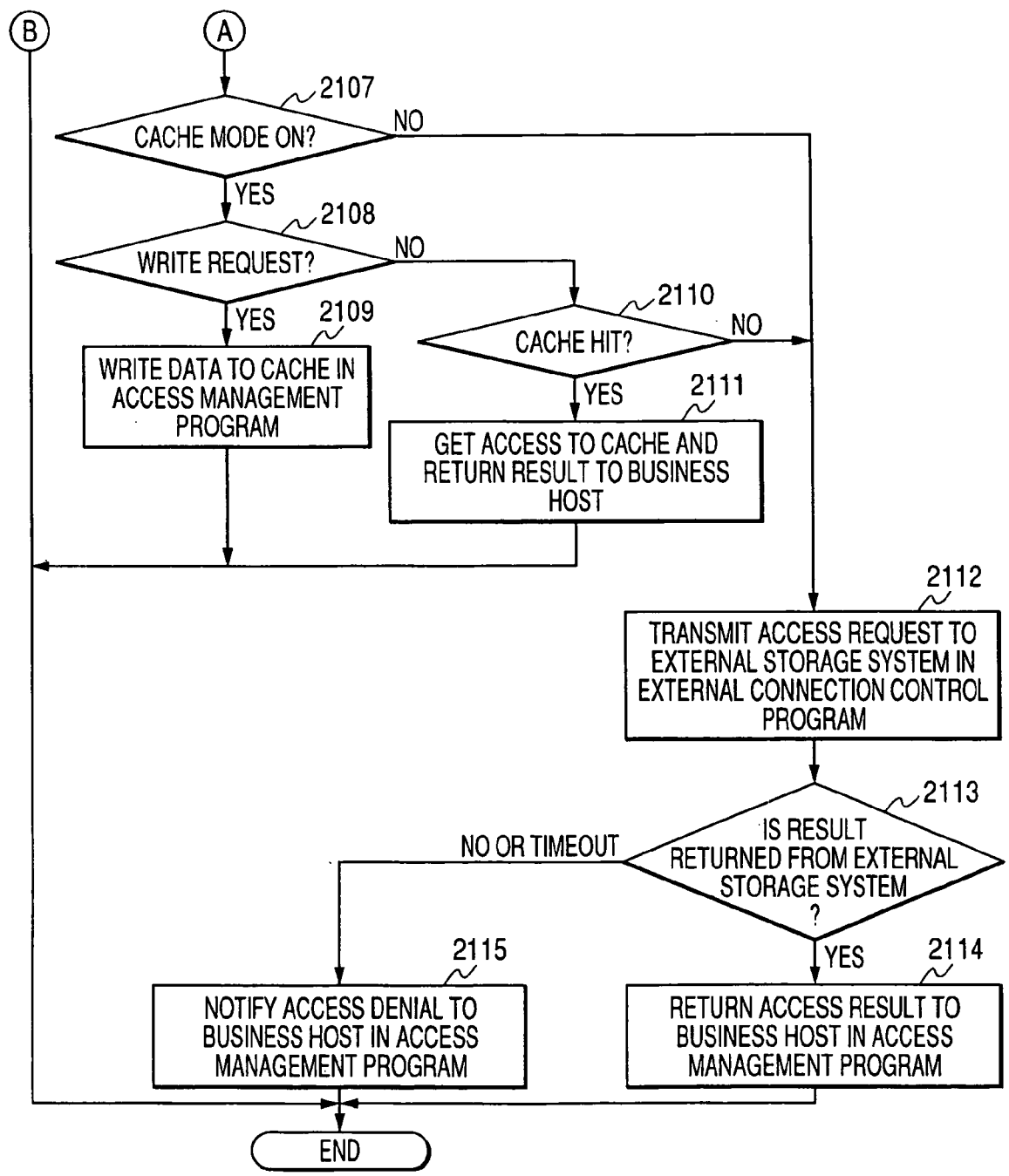
FIG. 23 is a flow chart showing one example of the operation of the storage system in receiving the access request of this embodiment.

Next, an explanation will be made with respect to an operation performed when the storage system 101 receives a read or write operation with respect to the logical volume constituting the logical volume group 320 from the business host 104. FIGS. 22 and 23 are flow charts showing one example of the operation of the storage system 101 in receiving the read or write operation with respect to the logical volume constituting the logical volume group 320 from the business host 104. The read or write operation is collectively called an access request.

The storage system 101 receives the access request with respect to a predetermined logical volume from the business host 104 (step 2101).

In the access management program 317, with reference to the volume table 301, the volume property of the logical volume of an object of the access request is read and it is discriminated whether the operation of the access request is prohibited or not (steps 2102, 2103).

When the operation of the access request is prohibited, access denial is notified to the business host 104 in the access management program 317 (step 2104), and the processing is terminated.

In contrast to this, when the operation of the access request is permitted, it is discriminated in the access management program 317 whether this logical volume is the virtual logical volume 322 or the real logical volume 321 (step 2105). Namely, access is gotten to the external volume table 303, and it is discriminated whether the identification data (LU#) of the designated logical volume is stored to the LU# column 1101 or not. When no identification data is stored to the LU# column 1101, it is discriminated that this logical volume is the real logical volume 321. In contrast to this, when the identification data is stored to the LU# column 1101, it is discriminated that this logical volume is the virtual logical volume 322, i.e., the logical volume constituting the logical volume group 420 of the external storage system 102.

When the object of the access is the real logical volume 321, access is gotten to this real logical volume 321 in the access management program 317, and a result is returned to the business host 104 (step 2106), and the processing is terminated.

In contrast to this, when the object of the access is the virtual logical volume 322 as the logical volume of the external storage system 102, it proceeds to a step 2107 of FIG. 23, and it is discriminated in the access management program 317 whether the cache mode is valid or invalid (step 2107). Namely, access is gotten to the volume table 301, and it is read and discriminated whether the cache mode of the entry storing the identification data (LU#) of this logical volume to the LU# column 901 is on or off (valid or invalid) (step 2107).

When the cache mode is valid, it is discriminated in the access management program 317 whether the operation in the access request from the business host 104 shows a write request or a read request (step 2108). When the cache mode is invalid, the processing proceeds to a step 2112.

When it is the write request, data are written to the cache 117 in the access management program 317 (step 2109).

In contrast to this, when it is the read request, the cache 117 is retrieved and it is checked whether data exist (step 2110). When the data exist, the data on the cache 117 are returned to the business host 104 (step 2111).

In contrast to this, when there are no data on the cache 117, or when the cache mode is off, the access request is outputted to the external storage system 102 in the external connection control program 312 (step 2112).

When an access result is returned from the external storage system 102, the access result is returned to the business host 104 in the access management program 317 (steps 2113, 2114), and the processing is terminated.

Here, when the result of access denial is returned from the external storage system 102, or when the access request is timed out, the access denial is notified to the business host 104 in the access management program 317 (step 2115), and the processing is terminated.

Figure 24:
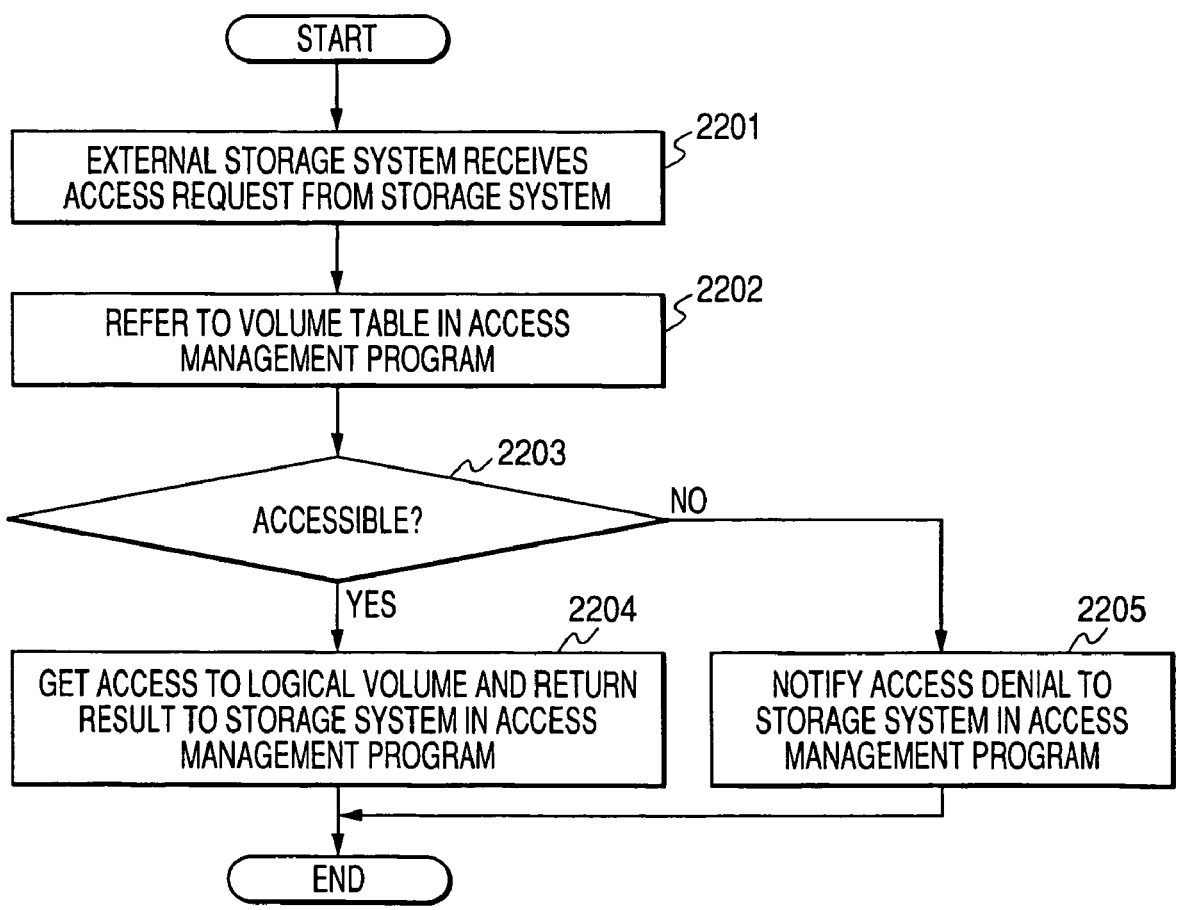
FIG. 24 is a flow chart showing one example of the operation of the external storage system in receiving the access request of this embodiment.

Next, processing in the external storage system 102 will be explained when there is an access request from the storage system 101 to the external storage system 102. FIG. 24 is a flow chart showing one example of the operation of the external storage system 102 at the access request processing time from the storage system 101 to the external storage system 102.

The external storage system 102 receives the access request to the logical volume constituting the logical volume group 420 from the storage system 101 (step 2201).

In the access management program 417 of the external storage system 102, with reference to the volume table 401, it is discriminated whether the volume property of the logical volume as an object of the access request permits an operation required in this access request or not (steps 2202, 2203).

When it is discriminated that this operation is permitted, access is gotten to the logical volume as an object of the access request in the access management program 417, and a result is returned to the storage system 101 (step 2204), and the processing is terminated.

In contrast to this, when it is discriminated that the above operation is not permitted, access denial is notified to the storage system 101 in the access management program 417 (step 2205), and the processing is terminated.

In FIG. 22, 23, and 24, processes executed by the access management program 317 of the storage system 101 and the access management program 417 of the external storage system 102 are mainly explained. However, when the storage system 101 or the external storage system 102 receives an access request, if they have the access guard control program 313 or 413 and these programs are activated, some additional processes are executed by these programs. Therefore, these additional processes are explained below.

If the storage system 101 has the access guard control program 313 and it is activated, between step 2101 and step 2102 of FIG. 22, the access guard control program 313 checks identification information of the source of the access request (a business host transmitted the access request) included in the access request, refers to host table, and decides whether the source of the access request is permitted to access the target logical volume. If the source of the access request is permitted to access the target logical volume, the step 2102 and the following steps are executed, but if the source of the access request is not permitted, the processing is terminated.

In a case of the external storage system 102, similar processes are added. If the external storage system 102 has the access guard control program 413 and it is activated, between step 2201 and step 2202 of FIG. 24, the access guard control program 413 checks identification information of the source of the access request (a port of the I/F for external connection 115 of the storage system 101) included in the access request, refers to host table, and decides whether the source of the access request is permitted to access the target logical volume. If the source of the access request is permitted to access the target logical volume, the step 2202 and the following steps are executed, but if the source of the access request is not permitted, the processing is terminated.

Next, processing in writing data from the storage system 101 to the external storage system 102 will be explained. When the access request from the business host 104 shows the write and the cache mode is off, this processing is performed at a time point at which there is the access request from the business host 104, i.e., in a step 2112 in the flow of FIG. 23. In contrast to this, when the access request from the business host 104 shows the write and the cache mode is on, this processing is processing performed at an arbitrary time point, e.g., at a time point at which a processing load of the storage system 101 is low.

FIG. 25 is a flow chart showing one example of the operation of the storage system 101 when data are written from the storage system 101 to the external storage system 102.

In the access management program 317, it is discriminated whether the storage system 101 holds the encryption write program 314 or not (step 2401). When the storage system 101 holds the encryption write program 314, data written to the external storage system 102 are encrypted by using an encryption key in the encryption write program 314 (step 2402).

In the external connection control program 312, the write data or the encrypted write data are written to the external storage system 102 (step 2403).

The storage system 101 receives the notification of write completion from the external storage system 102 (step 2404), and the processing is terminated.

As mentioned above, in accordance with this embodiment mode, in an information processing system for providing the volume of a second storage system (the external storage system 102) to the business host 104 as the volume of a first storage system (the storage system 101), the property change relating to the volume guard such as prohibition/permission of read and write of the logical volume of the external storage system 102 can be made through the management server 103. The management server 103 collects information of the storage system 101 and the external storage system 102, and presents selectable volume guard systems to the administrator of the storage system in accordance with a predetermined rule. It is sufficient for the administrator of the storage system to make a selection from the presented volume guard systems. Therefore, it is not necessary for the administrator of the storage system to extract a possible guard system of each storage system within the information processing system and consider a guard system using a combination. Accordingly, a setting error caused by the administrator of the storage system is reduced, and setting accuracy is raised, and the operation of the administrator of the storage system can be simplified.

What is claimed is:

1. A system comprising:
   a first storage system providing plural first logical volumes including a real logical volume and a virtual logical volume with a host computer as access targets;
   a second storage system having at least one second logical volume; and
   a management computer coupled to the first storage system and the second storage system to manage the system, wherein
   the real logical volume is a first logical volume configured from at least one disk of the first storage system, the virtual logical volume is a first logical volume associated with the second logical volume, and the second logical volume is configured from at least one disk of the second storage system, wherein
   when the first storage system receives an access request to the virtual logical volume, the first storage system is configured to access an associated second logical volume, wherein
   the management computer has information associated with a program for volume guard, which each of the first storage system and the second storage system has, and wherein
   the management computer is configured to receive a request to guard one of the plural first logical volumes, refer to the information, check whether a target first logical volume of the request is a real logical volume or a virtual logical volume, in case of the virtual logical volume, generate at least one option to guard the target first logical volume by using at least one of programs for volume guard, which at least one of the first storage system or the second storage system has, and display the at least one option.

2. A system according to claim 1, wherein
   the information, which the management computer has, includes storage information indicating whether each of the first storage system and the second storage system has a volume property control program and an access guard control program, wherein
   the volume property control program is arranged to control a property of a logical volume and change the property of the logical volume among "read/write", "read only", and "protect", and wherein
   the access guard control program is arranged to permit a particular access source to access a particular logical volume.

3. A system according to claim 2, wherein
   the information, which the management computer has, includes access guard corresponding information indicating whether the access guard control program is used for each of the plural first logical volumes and the at least one second logical volume, volume corresponding information indicating whether the volume property control program is used for each of the plural first logical volumes and the at least one second logical volume, and mapping information indicating mutual corresponding between a virtual logical volume and a corresponding second logical volume.

4. A system according to claim 3, wherein when the management computer receives a request to change a volume property of a virtual logical volume, and if the volume property control program is used for the virtual logical volume and the access guard control program is used for a second logical volume corresponded to the virtual logical volume, the management computer is arranged to generate at least one option in which the volume property of the virtual logical volume is changed by the volume property control program of the first storage system.

5. A system according to claim 3, wherein the management computer is further configured to receive one option selected among the at least one option displayed, and instruct at least one of the first storage system or the second storage system to change the property of at least one of the target first logical volume or a second logical volume associated with the target first logical volume according to the received option.

6. A system according to claim 5, wherein each of the first storage system and the second storage system further has the volume information indicating a current property and its retention term for each logical volume, for which the volume property control program is used, and wherein
   each of the first storage system and the second storage system is configured to decide whether a change of the property of a logical volume, which is instructed by the management computer, is possible or not by referring to the current property and the retention term in the volume information.

7. A system according to claim 6, wherein an instruction to change the property of a logical volume, which is issued from the management computer, includes a next property and a next retention term, and
   each of the first storage system and the second storage system is configured to determine that the change of the property of the logical volume is possible, if (a) the current property of the logical volume is "read/write", (b) the current property of the logical volume is "read only" or "protect", and its retention term is "0", (c) the current property of the logical volume and the next property is same, and the next retention term is longer than the retention term of the current property or (d) the current property of the logical volume is "read only", the next property is "protect", and the next retention term is longer than the retention term of the current property.

8. A system according to claim 5, wherein the first storage system further has a cache and information indicating whether the cache is used or not for each of the plural first logical volumes, when the first storage system receives an access request for a virtual logical volume from the host computer, the first storage system is configured to determine whether the cache is used for the virtual logical volume or not based on the information, if the cache is used for the virtual logical volume and the access request is a write request, the first storage system is configured to write data to the cache, and transfer the data to the second storage system at asynchronous timing of the write request.

9. A system according to claim 8, wherein before the management computer instruct the second storage system to change the property of the at least one second logical volume to "read only" or "protect", if the cache of the first storage system is used for a virtual logical volume associated with the at least one second logical volume, the management computer is configured to instruct the first storage system to transfer data of the virtual logical volume from the cache to the second storage system.

10. A computer program product for guarding a logical volume of a system, wherein the system includes a first storage system providing plural first logical volumes including a real logical volume and a virtual logical volume with a host computer as access targets, a second storage system having at least one second logical volume, and a management computer coupled to the first storage system and the second storage system to manage the system, wherein the real logical volume is a first logical volume configured by at least one disk of the first storage system, the virtual logical volume is a first logical volume associated with the second logical volume, the second logical volume is configured by at least one disk of the second storage system, and when the first storage system receives an access request to the virtual logical volume, the first storage system is configured to access an associated second logical volume, the computer program product comprising:

a recording medium;

a code, recorded in the recording medium, that causes the management computer to receive a request to guard one of the plural first logical volumes;

a code, recorded in the recording medium, that causes the management computer to refer information associated with a program for volume guard, which each of the first storage system and the second storage system has;

a code, recorded in the recording medium, that causes the management computer to check whether the target first logical volume of the request is a real logical volume or a virtual logical volume;

a code, recorded in the recording medium, that causes the management computer, in case that the target first logical volume is a virtual logical volume, to generate at least one option to satisfy the request by using at least one of programs for volume guard, which at least one of the first storage system or the second storage system has; and a code, recorded in the recording medium, that causes the management computer to display the at least one potion.

11. A method for guarding a logical volume of a system, which includes a first storage system, which provides plural first logical volumes including a real logical volume and a virtual logical volume with a host computer as access targets, a second storage system having at least one second logical volume, and a management computer coupled to the first storage system and the second storage system to manage the system, wherein the real logical volume is a first logical volume configured from at least one disk of the first storage system, the virtual logical volume is a first logical volume associated with the second logical volume, the second logical volume is configured from at least one disk of the second storage system, and when the first storage system receives an access request to the virtual logical volume, the first storage system is configured to access an associated second logical volume, the method comprising steps of:

receiving a request to guard one of the plural first logical volumes at the management computer;

referring information associated with a program for volume guard, which each of the first storage system and the second storage system has, at the management computer;

checking whether the target first logical volume of the request is a real logical volume or a virtual logical volume, at the management computer;

in case that the target first logical volume is a virtual logical volume, generating at least one option to satisfy the request by using at least one of programs for volume guard, which at least one of the first storage system or the second storage system has, at the management computer; and displaying the at least one potion.

12. A method for guarding a logical volume according to claim 11, wherein the information, which is referred by the management computer at the step of referring, includes storage information indicating whether each of the first storage system and the second storage system has a volume property control program and an access guard control program, wherein the volume property control program is arranged to control the property of a logical volume and change the property of the logical volume among "read/write", "read only", and "Protect", and wherein the access guard control program is arranged to permit a particular access source to access a particular logical volume.

13. A method for guarding a logical volume according to claim 12, wherein the information, which is referred by the management computer at the step of referring, includes access guard corresponding information indicating whether the access guard control program is used for each of the plural first logical volumes and the at least one second logical volume, volume corresponding information indicating whether the volume property control program is used for each of the plural first logical volumes and the at least one second logical volume, and mapping information indicating mutual corresponding between a virtual logical volume and a corresponding second logical volume.

14. A method for guarding a logical volume according to claim 13, wherein when the management computer receives a request to change a volume property of a virtual logical volume, and if the volume property control program of the first storage system is used for the virtual logical volume and the access guard control program is used for a second logical volume corresponded to the virtual logical volume, the management computer generates at least one option in which the volume property of the virtual logical volume is changed by the volume property control program of the first storage system.

15. A method for guarding a logical volume according to claim 13, further comprising steps of:
   receiving one option selected out of the at least one option displayed; and
   instructing at least one of the first storage system or the second storage system to change the property of at least one of the target first logical volume or a second logical volume associated with the target first logical volume according to the received option.

16. A method for guarding a logical volume according to claim 15, wherein each of the first storage system and the second storage system further has the volume information indicating a current property and its retention term for each logical volume, for which the volume property control program is used, and the method further comprising a step of:
   deciding whether a change of the property of a logical volume, which is instructed by the management computer at the step of instructing, is possible or not by referring to the current property and the retention term at a storage system, which receives an instruction from the management computer.

17. A method for guarding a logical volume according to claim 16, wherein an instruction to change the property of a logical volume, which is issued from the management computer, includes a next property and a next retention term, and
   at the step of deciding, the storage system determines that the change of the property of the logical volume is possible, if (a) the current property of the logical volume is "read/write",
(b) the current property of the logical volume is "read only" or "protect", and its retention term is "0",
(c) the current property of the logical volume and the next property is same, and the next retention term is longer than the retention term of the current property or
(d) the current property is "read only", the next property is "protect" and the next retention term is longer than the retention term of the current property.

18. A method for guarding a logical volume according to claim 15, wherein the first storage system further has a cache and information indicating whether the cache is used or not for each of the plural first logical volumes,
   when the first storage system receives an access request for a virtual logical volume from the host computer, the first storage system determines whether the cache is used for the virtual logical volume or not based on the information,
   if the cache is used for the virtual logical volume and the access request is a write request, the first storage system writes data to the cache, and transfers the data to the second storage system at asynchronous timing of the write request.

19. A method for guarding a logical volume according to claim 18, wherein before the step of instructing, if the management computer instructs the second storage system to change the property of at least one second logical volume to "read only" or "protect", and the cache of the first storage system is used for a virtual logical volume associated with the at least one second logical volume, the management computer instructs the first storage system to transfer data of the virtual logical volume from the cache to the second storage system.

20. A method for guarding a logical volume according to claim 11, further comprising a step of:
   in case that the target first logical volume is a real logical volume, instructing the first storage system to change the property of the target first logical volume according to the request.

* * * * *